US010423829B2

(12) United States Patent
Amano

(10) Patent No.: US 10,423,829 B2
(45) Date of Patent: Sep. 24, 2019

(54) SIGNAL OBSERVATION DEVICE AND SIGNAL OBSERVATION METHOD

(71) Applicant: Panasonic Intellectual Property Corporation of America, Torrance, CA (US)

(72) Inventor: Hiroshi Amano, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 169 days.

(21) Appl. No.: 15/271,374

(22) Filed: Sep. 21, 2016

(65) Prior Publication Data

US 2017/0091518 A1 Mar. 30, 2017

(30) Foreign Application Priority Data

Sep. 30, 2015 (JP) ................................. 2015-194665

(51) Int. Cl.
*G06K 9/00* (2006.01)
*G09G 5/24* (2006.01)

(52) U.S. Cl.
CPC ....... *G06K 9/0057* (2013.01); *G06K 9/00503* (2013.01); *G09G 5/24* (2013.01); *G09G 2320/10* (2013.01)

(58) Field of Classification Search
CPC .................. G06T 5/50; G06T 2207/20224
USPC .................................................. 345/644, 645
See application file for complete search history.

(56) References Cited

U.S. PATENT DOCUMENTS

2012/0038798 A1* 2/2012 Woods ................... H04N 5/335
348/241

FOREIGN PATENT DOCUMENTS

JP  2015-510356  4/2015
WO  2013/119593  8/2013

OTHER PUBLICATIONS

J.Zheng, et. al., Video compressive sensing using spatial domain sparsity, Optical Engineering 48(8) (2009) (Year: 2009).*
(Continued)

*Primary Examiner* — Andrew Caldwell
*Assistant Examiner* — Emily E Larocque
(74) *Attorney, Agent, or Firm* — Greenblum & Bernstein, P.L.C.

(57) ABSTRACT

A signal observation device includes: an observation unit that observes a volume of a target signal by using compressed sensing; a filter having a plurality of elements that are arranged in a matrix and that are capable of individually restricting the volume of the target signal to be transmitted to the observation unit; and a control unit that causes the observation unit to observe the volume of the target signal transmitted via the filter by using first control for controlling the elements of the filter on the basis of a first observation matrix in which values of matrix elements are predetermined and that causes the observation unit to observe the volume of the target signal transmitted via the filter using second control for controlling the elements of the filter on the basis of a second observation matrix in which values of matrix elements are based on random numbers. The control unit causes the observation unit to observe the volume of the target signal plural times by selectively using the first control and the second control.

9 Claims, 23 Drawing Sheets

(56) References Cited

OTHER PUBLICATIONS

J. Zheng, et. al., The application of Compressive Sensing technique on a stationary surveillance camera system, Proceedings of SPIE, 2008 (Year: 2008).*

T. Wech, et al., Resolution evaluation of MR images reconstructed by iterative thresholding algorithms for compressed sensing, Am. Assoc. Phys. Med., Med. Phys. 39(7) 2012 (Year: 2012).*

S. Uttam, et al., Feature-Specific Difference Imaging, IEEE Transactions on Image Processing, vol. 21, No. 2, 2012 (Year: 2012).*

M. Duarte, et al., Single-Pixel Imaging via Compressive Sampling, IEEE Signal Processing Magazine, 2008 (Year: 2008).*

Toshiyuki Tanaka "Mathematics of Compressed Sensing", IEICE, Fundamentals Review vol. 4, No. 1, Jul. 2010, pp. 39-47.

* cited by examiner

FIG. 3

$$\begin{bmatrix} 0 & 1 \\ 1 & 0 \end{bmatrix}$$

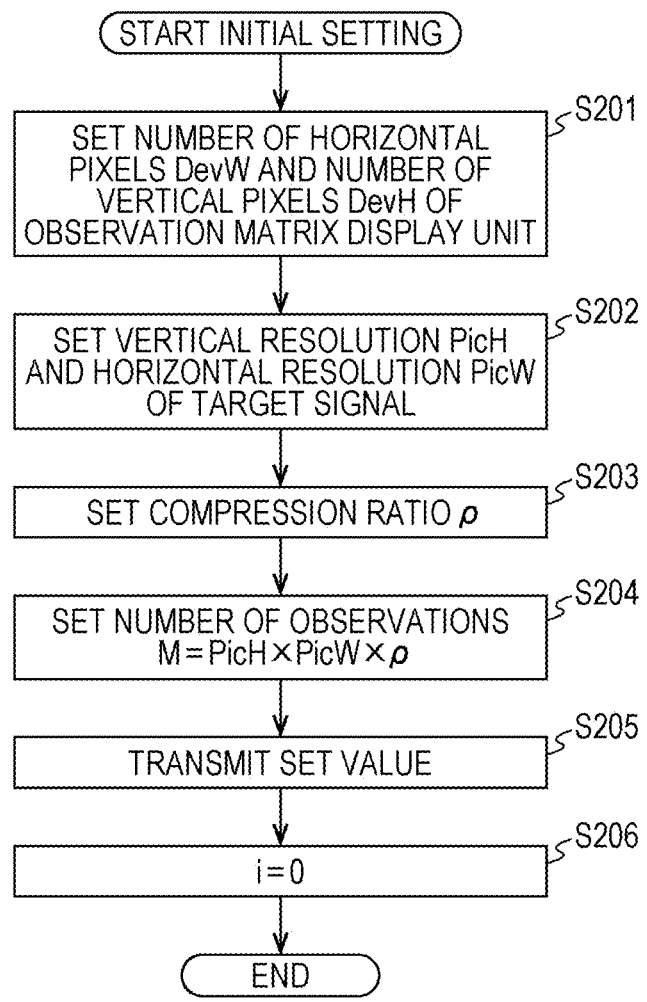

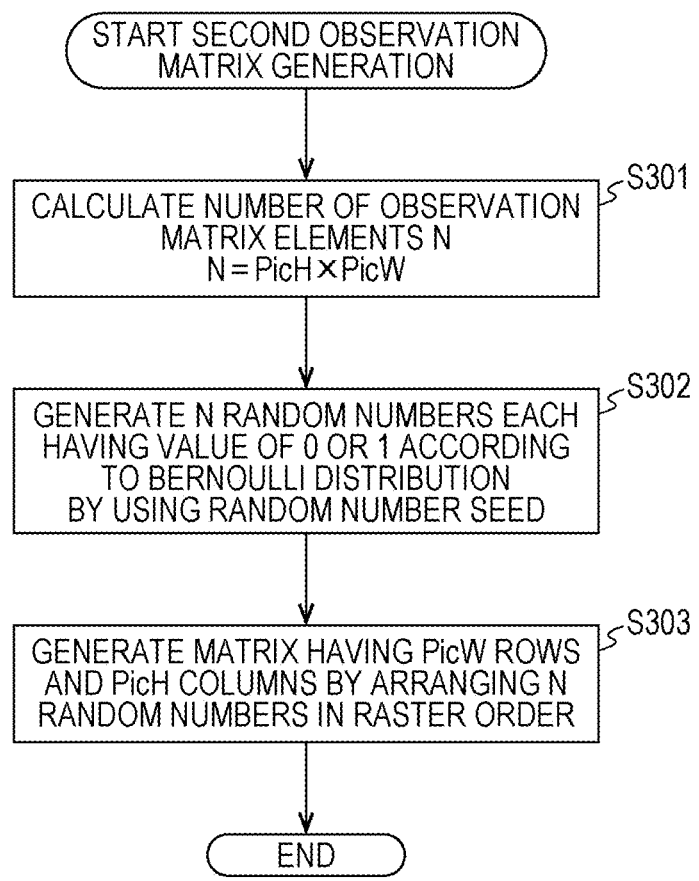

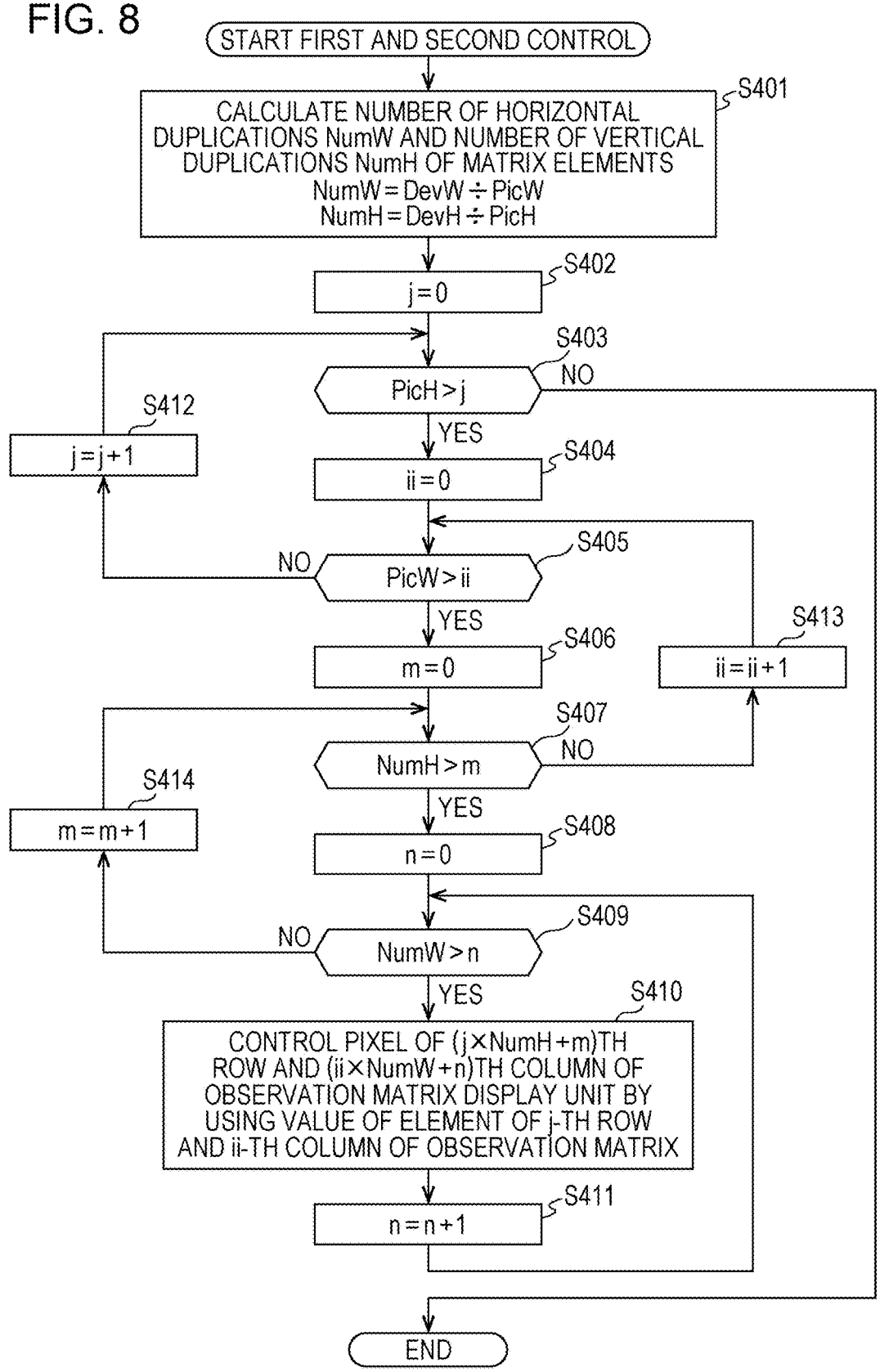

FIG. 18

| IDENTIFICATION NUMBER | ADDRESS | DATA |
|---|---|---|
| 0 | 0 | 01001000 |
| 1 | 8 | 11011010 |
| 2 | 16 | 00010111 |
| ...... | ...... | ...... |

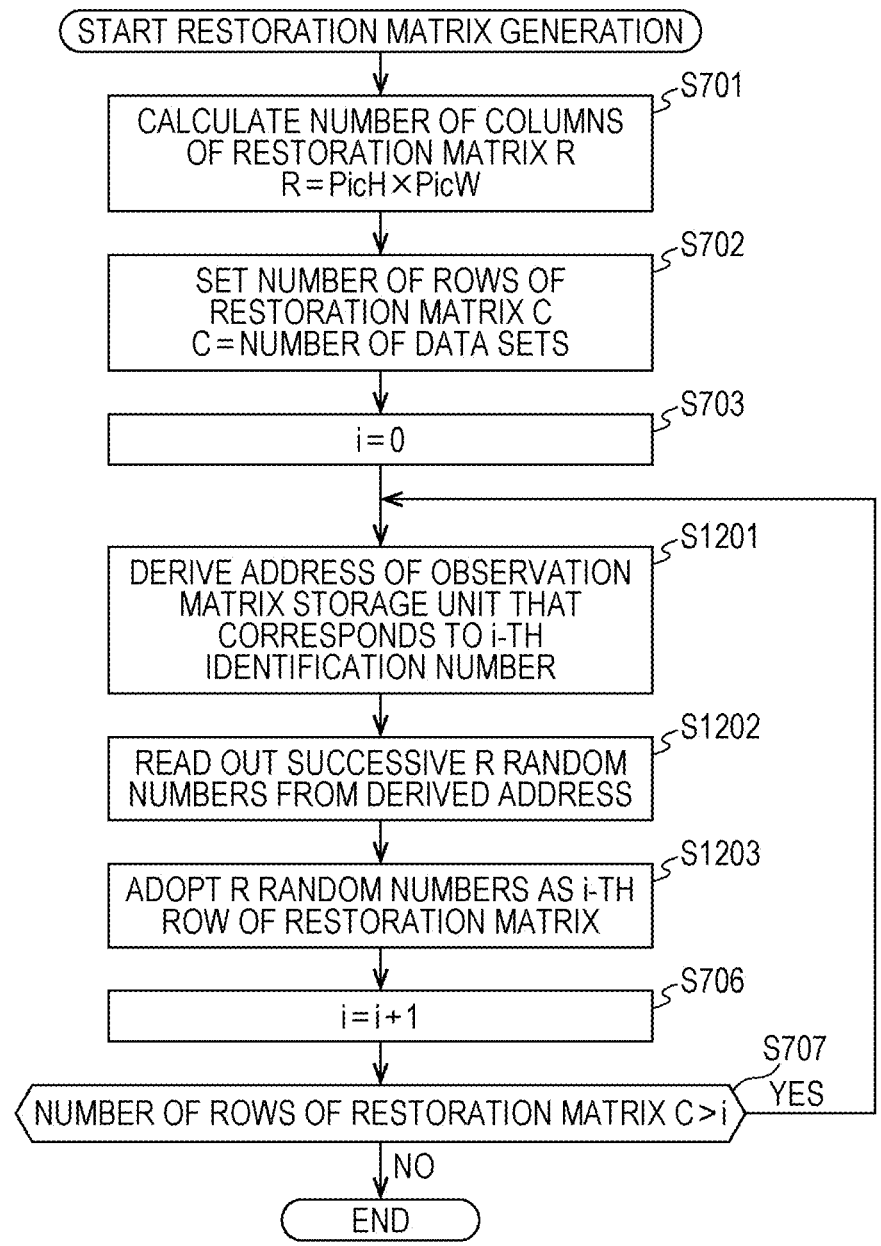

SIGNAL OBSERVATION DEVICE AND SIGNAL OBSERVATION METHOD

BACKGROUND

1. Technical Field

The present disclosure relates to a signal observation device using compressed sensing.

2. Description of the Related Art

In recent years, a signal observation technique using compressed sensing is attracting attention. This compressed sensing is also called compressed sampling or sparse sampling. The compressed sensing is a technique that makes it possible to restore an original signal from a signal acquired with the number of samples that is equal to or lower than the sampling theorem under a condition that the signal is sparse and is a technique that acquires and compresses a signal concurrently.

The expression "signal is sparse" means that many coefficients become almost 0 when the signal is projected to a wavelet space, a discrete cosine space, or the like. A method such as L1 norm minimization is used as a signal restoration method utilizing sparsity of a signal (see, for example, Toshiyuki TANAKA "Mathematics of Compressed Sensing", The Institute of Electronics, Information and Communication Engineers, Engineering Sciences Society, Fundamental Review Vol. 4 No. 1, July 2010 (pp. 39-47) (hereinafter referred to as "Non-Patent Literature 1")).

Japanese Unexamined Patent Application Publication (Translation of PCT Application) No. 2015-510356 (hereinafter referred to as "Patent Literature 1") discloses lens-free image acquisition using compressed sensing. In the image acquisition of Patent Literature 1, light reflected by a subject is selectively delivered onto a single detector by using a shutter array. By performing such light detection plural times, a high-resolution image is acquired by the detector.

SUMMARY

In one general aspect, the techniques disclosed here feature a signal observation device includes: an observation unit that observes a volume of a target signal by using compressed sensing; a filter having a plurality of elements that are arranged in a matrix and that are capable of individually restricting the volume of the target signal to be transmitted to the observation unit; and a control unit that causes the observation unit to observe the volume of the target signal transmitted via the filter by using first control for controlling the elements of the filter on the basis of a first observation matrix in which values of matrix elements are predetermined and that causes the observation unit to observe the volume of the target signal transmitted via the filter using second control for controlling the elements of the filter on the basis of a second observation matrix in which values of matrix elements are based on random numbers. The control unit causes the observation unit to observe the volume of the target signal plural times by selectively using the first control and the second control.

According to a signal observation device according to one aspect of the present disclosure, it is possible to suppress a deterioration of a signal caused by noise in signal observation using compressed sensing.

It should be noted that general or specific embodiments may be implemented as a system, a method, an integrated circuit, a computer program, a computer-readable storage medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating an example of an observation matrix according to Embodiment 1;

FIG. 6 is a flow chart illustrating an example of an initial setting process performed by the signal observation device according to Embodiment 1;

FIG. 7 is a flow chart illustrating an example of an observation matrix generation process performed by an observation matrix generation unit according to Embodiment 1;

FIG. 8 is a flow chart illustrating an example of a process for controlling an observation matrix display unit according to Embodiment 1;

FIG. 18 is a diagram illustrating an example of information indicating correspondences between identification numbers and addresses according to Embodiment 5;

FIG. 21 is a flow chart illustrating a restoration matrix generation process performed by a restoration matrix generation unit according to Embodiment 5.

DETAILED DESCRIPTION

Figure 1:
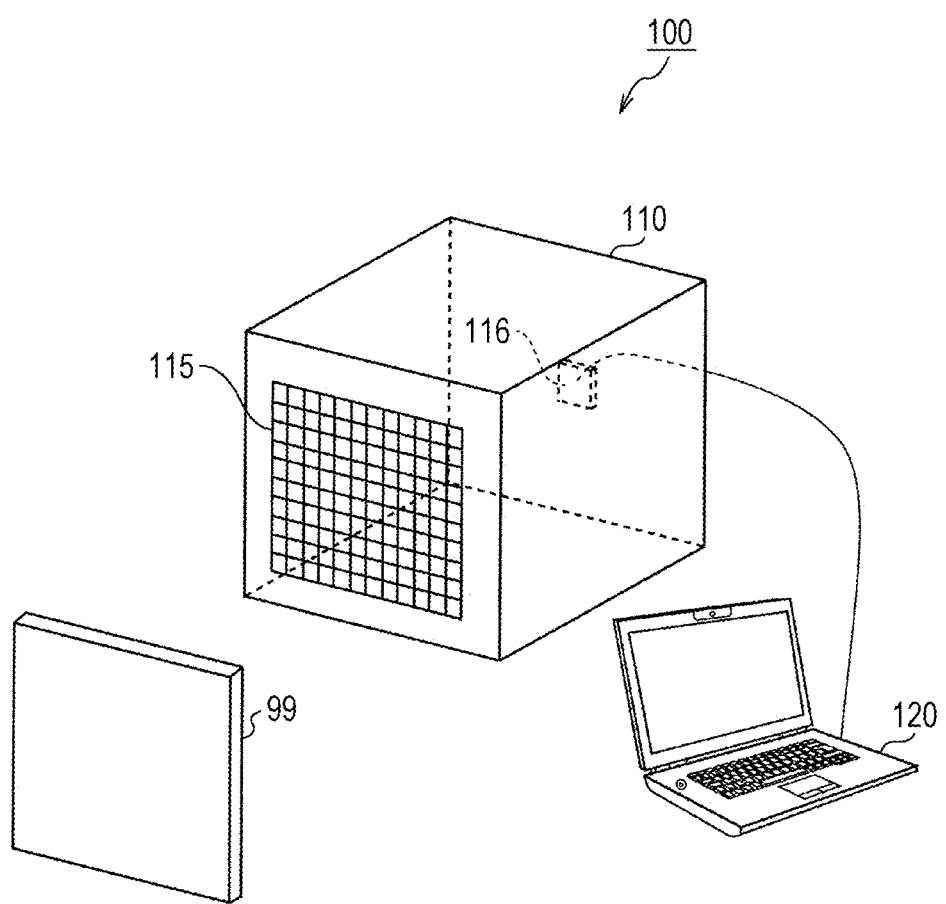
FIG. 1 is an external view of a signal observation system according to Embodiment 1.

Underlying Knowledge Forming Basis of the Present Disclosure

There are cases where an external environment, the state of a detector, or the like changes during a plurality of observations for obtaining a high-resolution image. In such cases, according to the conventional techniques, noise that occurs due to the change in external environment, state of a detector, or the like sometimes causes a deterioration in quality of an image restored from a compressed signal and sometimes makes it impossible to restore an image from a compressed signal.

The present disclosure provides a signal observation device and a signal observation method that make it possible to suppress a deterioration of a signal caused by noise in signal observation using compressed sensing.

A signal observation device according to one aspect of the present disclosure is a signal observation including: an observation unit that observes a volume of a target signal by using compressed sensing; a filter having a plurality of elements that are arranged in a matrix and that are capable of individually restricting the volume of the target signal to be transmitted to the observation unit; and a control unit that causes the observation unit to observe the volume of the target signal transmitted via the filter by using first control for controlling the elements of the filter on the basis of a first observation matrix in which values of matrix elements are predetermined and that causes the observation unit to observe the volume of the target signal transmitted via the filter using second control for controlling the elements of the filter on the basis of a second observation matrix in which values of matrix elements are based on random numbers. The control unit causes the observation unit to observe the volume of the target signal plural times by selectively using the first control and the second control.

According to the arrangement, the target signal can be observed plural times by selectively using the first control using the first observation matrix in which values of matrix elements are predetermined and the second control using the second observation matrix in which values of matrix elements are based on random numbers. Since a difference value between an observation value of the target signal obtained by the first control and an observation value of the target signal obtained by the second control can be calculated, the target signal can be restored by using the difference value. As a result, it is possible to restore the signal by emphasizing a change in observation value obtained by an observation matrix during the plural observations, thereby suppressing a deterioration of the signal caused by noise.

For example, the signal observation device may be arranged such that all of the matrix elements of the first observation matrix have the same value.

According to the arrangement, an observation matrix in which all matrix elements have the same value can be used as the first observation matrix. Since the plurality of elements of the filter can be uniformly controlled, a change in observation value obtained by an observation matrix during the plural observations can be properly emphasized.

For example, the signal observation device may be arranged such that in the first control, the elements of the filter are controlled, on the basis of the first observation matrix, to a restricted state in which the volume of the target signal to be transmitted to the observation unit is restricted.

According to the arrangement, in the first control, the elements of the filter can be controlled to the restricted state. Since a difference value can be calculated by using an observation value obtained in the state where transmission of the target signal to the observer is restricted, noise can be reduced in an observation value of the target signal obtained by the second control. It is therefore possible to suppress a deterioration of the signal caused by noise.

For example, the signal observation device may be arranged such that the first control is applied in an initial one of the plural observations.

According to the arrangement, the first control can be applied in the initial observation. Since an observation value obtained by using the first control has been already obtained in a subsequent observation using the second control, a difference value can be promptly obtained. It is therefore possible to reduce a buffer for observation values.

For example, the signal observation device may be arranged such that the first control is applied in a middle one of the plural observations.

According to the arrangement, the first control can be applied in a middle observation. This makes it possible to calculate a difference value between observation values obtained in observations that are relatively close in time to each other, thereby keeping influence of noise caused by a temporal change low.

For example, the signal observation device may be arranged such that the first control is applied in every predetermined number of observations among the plural observations.

According to the arrangement, the first control can be applied in every predetermined number of observations. This makes it possible to calculate a difference value between observation values obtained in observations that are relatively close in time to each other, thereby keeping influence of noise caused by a temporal change low.

For example, the signal observation device may be arranged such that the first control and the second control are alternately applied in the plural observations.

According to the arrangement, the first control and the second control can be alternately applied. This makes it possible to calculate a difference value between observation values obtained in observations that are adjacent in time to each other, thereby keeping influence of noise caused by a temporal change low.

For example, the signal observation device may be arranged such that the control unit calculates a difference value between the volume of the target signal observed by using the first control and the volume of the target signal observed by using the second control; and the signal observation device further comprises a communicator that transmits the difference value to a signal restoration device that restores the target signal by using the difference value.

According to the arrangement, a difference value can be calculated in the signal observation device. This makes it unnecessary to calculate a difference value in a signal restoration device, thereby making it easy to restore the target signal. Furthermore, the volume of communication from the signal observation device 110 to the signal restoration device 120 can be reduced.

It should be noted that general or specific embodiments may be implemented as a system, a method, an integrated circuit, a computer program, a computer-readable storage medium such as a CD-ROM, or any selective combination thereof.

Embodiments are described in detail below with reference to the drawings.

Each of the embodiments described below is a general or specific example of the present disclosure. Numerical values, shapes, materials, constituent elements, positions of the constituent elements, the way in which the constituent elements are disposed, steps, the order of steps, and the like in the embodiments below are examples and do not limit the claims. Among constituent elements in the embodiments described below, constituent elements that are not described in independent claims that indicate the highest concepts are described as optional constituent elements.

Embodiment 1

Configuration of Signal Observation System

Figure 2:
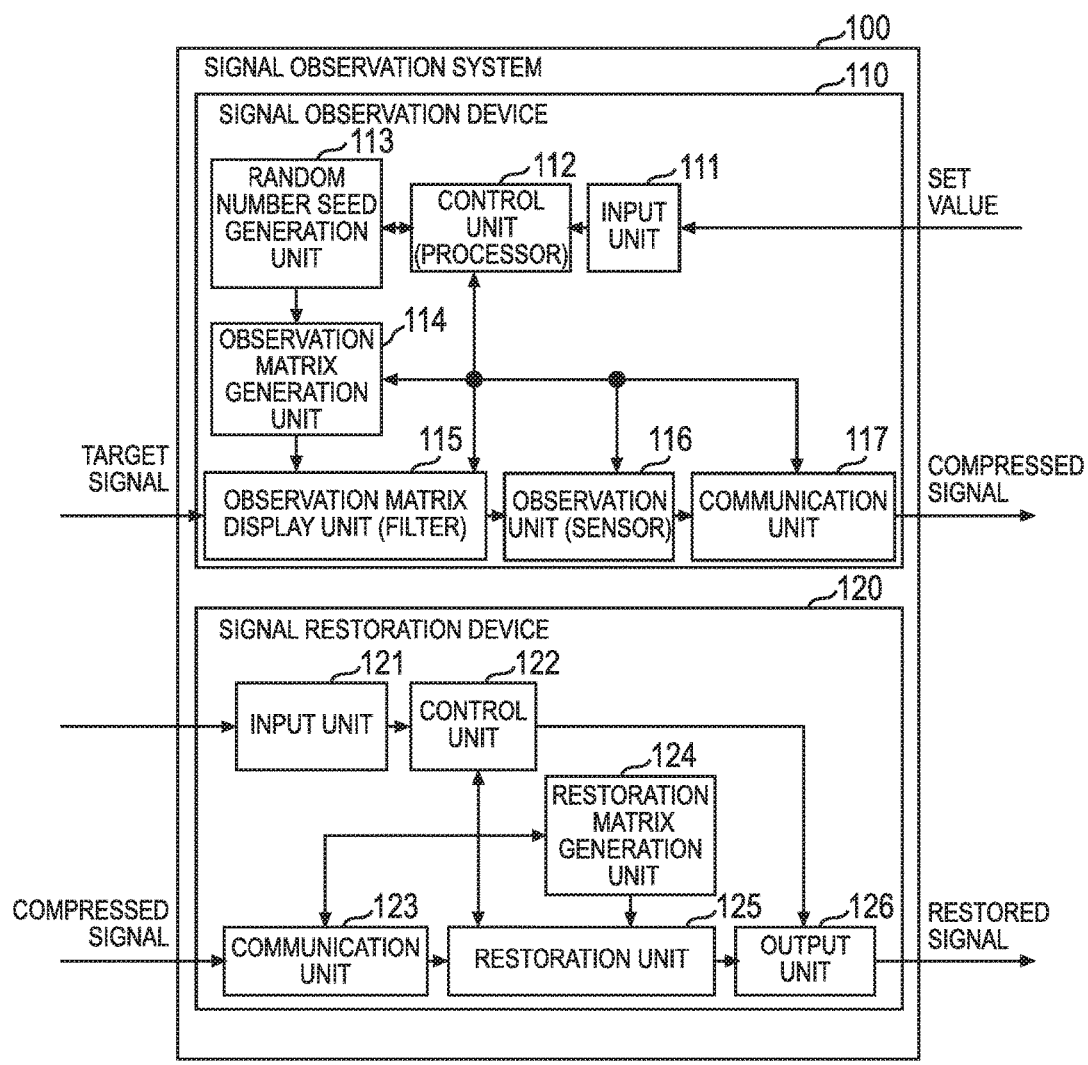
FIG. 2 is a block diagram illustrating an example of a configuration of the signal observation system according to Embodiment 1.

FIG. 1 is an external view illustrating a signal observation system according to Embodiment 1. FIG. 2 is a block diagram illustrating an example of a configuration of the signal observation system according to Embodiment 1. In FIG. 1, the broken lines indicate portions that are hidden from view. As illustrated in FIGS. 1 and 2, a signal observation system 100 includes a signal observation device 110 and a signal restoration device 120.

The signal observation device 110 observes a target signal to be observed plural times by using compressed sensing and outputs a compressed signal that will be described later as an observation result. In the present embodiment, a case where the target signal to be observed is a visible light signal radiated or reflected from a subject 99 is described. In the present embodiment, it is assumed that the signal observation device 110 observes a visible light signal radiated or reflected from the same subject 99 plural times. Note that the target signal to be observed is not limited to a visible light signal. For example, the target signal to be observed may be an infrared signal, a terahertz wave signal, or an ultraviolet signal.

The signal observation device 110 includes an input unit 111, a control unit 112, a random number seed generation unit 113, an observation matrix generation unit 114, an observation matrix display unit 115, an observation unit 116, and a communication unit 117.

The input unit 111 receives user's input and transmits the input to the control unit 112. For example, the input unit 111 is a keyboard, a touch panel, or the like. Specifically, the input unit 111 receives input of the number of pixels of a target signal to be observed (image). The number of pixels of a target signal to be observed is, for example, expressed by the number of pixels in a vertical direction (i.e., the first number of rows) and the number of pixels in a horizontal direction (i.e., the first number of columns) of an image indicated by the target signal to be observed.

The control unit 112 acquires information from the input unit 111 and controls the random number seed generation unit 113, the observation matrix generation unit 114, the observation matrix display unit 115, the observation unit 116, and the communication unit 117.

Note that the control unit 112 may be realized in any ways, as long as the control unit 112 has a control function. For example, the control unit 112 may be realized by dedicated hardware. Alternatively, for example, the control unit 112 may be realized by execution of a software program suitable for the constituent elements. In this case, the control unit 112 may include, for example, an arithmetic processing unit (not illustrated) and a storage unit (not illustrated) in which the control program is stored. The arithmetic processing unit is, for example, an MPU (Micro Processing Unit) or a CPU (Central Processing Unit). The storage unit is, for example, a semiconductor memory. Note that the control unit 112 may be constituted by a single control unit that performs centralized control or may be constituted by a plurality of control units that perform decentralized control in cooperation with one another.

The random number seed generation unit 113 generates a plurality of random number seeds for use in the observation matrix generation unit 114.

The observation matrix generation unit 114 generates a plurality of observation matrices each having a size determined on the basis of the number of pixels of the target signal to be observed (the first number of rows and the first number of columns) that is acquired from the input unit 111. The observation matrix generation unit 114 determines, as the number of rows (the first number of rows) of an observation matrix to be generated, the number of pixels in the vertical direction of the target signal to be observed that is acquired from the input unit 111. Furthermore, the observation matrix generation unit 114 determines, as the number of columns (the first number of columns) of an observation matrix to be generated, the number of pixels in the horizontal direction of the target signal to be observed that is acquired from the input unit 111. In this way, the first number of rows and the first number of columns are determined as the size of the observation matrix to be generated.

In this case, the number of matrix elements included in the observation matrix to be generated is the product of the first number of rows and the first number of columns.

How values of the matrix elements included in the observation matrix are determined will be described later.

The observation matrices include, for example, a first observation matrix and a second observation matrix that will be described later.

The observation matrix generation unit 114 generates the first observation matrix having the first number of rows and the first number of columns that are acquired from the input unit 111.

The generated first observation matrix has a predetermined pattern. This means, for example, that values of all of or almost all of the matrix elements included in the first observation matrix are determined in advance.

The first observation matrix having the predetermined pattern is, for example, one in which values of a plurality of matrix elements are uniform. This means, for example, that all of or almost all of the matrix elements included in the first observation matrix have the substantially same value (e.g., 0). In the present embodiment, an example in which values of all of the matrix elements included in the first observation matrix are 0 is described.

Furthermore, the observation matrix generation unit 114 generates the second observation matrix having the first number of rows and the first number of columns that are acquired from the input unit 111. The observation matrix generation unit 114 calculates values of matrix elements of the second observation matrix, for example, on the basis of a random number seed generated by the random number seed generation unit 113.

The observation matrix display unit 115 is an example of a filter. The observation matrix display unit 115 is disposed on a transmission path through which the target signal to be observed is transmitted to the observation unit 160. For example, the observation matrix display unit 115 has a plurality of elements that are arranged in a matrix.

The plurality of elements are capable of individually restricting the volume of target signal to be transmitted to the observation unit 116. For example, the observation matrix display unit 115 is a transmission-type liquid crystal display having a plurality of pixels whose transmittance can be individually controlled.

For example, each of the plurality of pixels included in the transmission-type liquid crystal display corresponds to any of the plurality of elements that are arranged in a matrix. Each of the plurality of elements of the observation matrix display unit 115 controls transmittance of a corresponding pixel by controlling a state thereof. The observation matrix display unit 115 controls transmittance of the pixels, for example, by controlling states of the respective elements. As a result, the observation matrix display unit 115 can control the volume of signal to be transmitted to the observation unit 160.

The observation matrix display unit 115 is disposed between the subject 99 and the observation unit 116 as illustrated in FIG. 1.

The control unit 112 causes the observation unit 116 to observe the volume of target signal transmitted through the observation matrix display unit 115 while changing the states of the elements of the observation matrix display unit 115 on the basis of an observation matrix generated by the observation matrix generation unit 114.

For example, the control unit 112 associates each matrix element included in the observation matrix generated by the observation matrix generation unit 114 with any of the plurality of elements of the observation matrix display unit 115.

The control unit 112 may associates each matrix element included in the observation matrix with any one of the elements of the observation matrix display unit 115 on a one-to-one basis.

Alternatively, the control unit 112 may associate each matrix element included in the observation matrix with a plurality of elements of the observation matrix display unit 115. However, the control unit 112 does not associate a plurality of matrix elements included in the observation matrix with a single element of the observation matrix display unit 115.

The control unit 112 controls a state of each element of the observation matrix display unit 115 that is associated with a matrix element of the observation matrix on the basis of the value of the matrix element. Note that in a case where there is an element that is not associated with any of the matrix elements of the observation matrix among the plurality of elements of the observation matrix display unit 115, the control unit 112 controls the state of this element to a predetermined state.

Associating each of the matrix elements of the observation matrix with any of the plurality of elements of the observation matrix display unit 115, controlling the states of the elements on the basis of the values of the corresponding matrix elements, and controlling the state of an element of the observation matrix display unit 115 that is not associated with any of the matrix elements of the observation matrix to a predetermined state are referred to as controlling each element (or each pixel) of the observation matrix display unit 115 on the basis of the observation matrix.

As described above, the observation matrix generation unit 114 generates the first observation matrix and the second observation matrix. The control unit 112 causes the observation unit 116 to observe the target signal plural times by selectively using first control for controlling the elements of the observation matrix display unit 115 on the basis of the first observation matrix and second control for controlling the elements of the observation matrix display unit 115 on the basis of the second observation matrix.

Causing the observation unit 116 to observe the target signal means measuring (or detecting or outputting) the volume of target signal to be transmitted to a single detector provided in the observation unit 116 through the observation matrix display unit 115.

An operation in which the control unit 112 causes the observation unit 116 to observe the target signal by using the first control means, for example, that the control unit 112 causes the observation unit 116 to observe the target signal while performing the first control.

An operation in which the control unit 112 causes the observation unit 116 to observe the target signal by using the second control means, for example, that the control unit 112 causes the observation unit 116 to observe the target signal while performing the second control.

An operation in which the control unit 112 causes the observation unit 116 to observe the target signal plural times by selectively using the first control and the second control means, for example, that the control unit 112 selects one of the first control and the second control and causes the observation unit 116 to performs an observing operation plural times while performing the selected control.

The number of observing operations may be determined in advance.

The plural operations include at least one operation in which the control unit 112 selects the first control and causes the observation unit 116 to observe the target signal while performing the first control.

Furthermore, the plural operations include at least two operations in which the control unit 112 selects the second control and causes the observation unit 116 to observe the target signal while performing the second control. In this case, in a case where the random number seed generation unit 113 generates a different random number seed every time the control unit 112 selects the second control and where the observation matrix generation unit 114 generates the second observation matrix on the basis of the random number seed thus generated, a different second observation matrix is generated every time the second control is selected.

The first one of the plural operations (i.e., an initial operation or an initial observation made by the observation unit 116) may be an operation in which the control unit 112 selects the first control and causes the observation unit 116 to make an observation while performing the first control.

Alternatively, a middle one of the plural operations (the ordinal number thereof corresponds to a quotient obtained when the number of times of selection of the second control is divided by 2) may be an operation in which the control unit 112 selects the first control and causes the observation unit 116 to make an observation while performing the first control.

Alternatively, an operation in which the control unit 112 selects the first control and causes the observation unit 116 to make an observation while performing the first control and an operation in which the control unit 112 selects the second control and causes the observation unit 116 to make an observation while performing the second control may be alternately performed. In this case, a pair of the operation in which the control unit 112 selects the first control and causes the observation unit 116 to make an observation while performing the first control and the operation in which the control unit 112 selects the second control and causes the observation unit 116 to make an observation while performing the second control may be performed plural times.

Next, a specific example in which the control unit 112 controls the elements of the observation matrix display unit 115 by using an observation matrix is described.

The control unit 112 controls a state of an element (also referred to as a pixel) of the observation matrix display unit 115 in accordance with a value of a corresponding matrix element included in an observation matrix. For example, in a case where the value of a matrix element of the observation matrix is 0, the control unit 112 controls the state of an element of the observation matrix display unit 115 that corresponds to the matrix element to a restricted state. Meanwhile, in a case where the value of a matrix element of the observation matrix is 1, the control unit 112 controls the state of an element of the observation matrix display unit 115 that corresponds to the matrix element to a non-restricted state.

The restricted state is a state where the volume of target signal to be transmitted to the observation unit 116 is restricted and is, for example, a non-transmission state. The non-restricted state is a state where the volume of target signal to be transmitted to the observation unit 116 is not restricted and is, for example, a transmission state.

Correspondences between the matrix elements of the observation matrix and the elements of the observation matrix display unit 115 are described below with reference to FIGS. 3 and 4A through 4E. In FIGS. 4A through 4E, the hatched regions represent pixels obtained in a case where corresponding elements are in the restricted state (non-transmission state), and the white regions represent pixels obtained in a case where corresponding elements are in the non-restricted state (transmission state). In the following description, a case where the state of an element that corresponds to a matrix element having a value of 0 is controlled to the restricted state and the state of an element that corresponds to a matrix element having a value of 1 is controlled to the non-restricted state is described.

Figure 3:
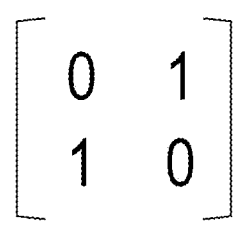

FIG. 3 illustrates an example of an observation matrix. The observation matrix illustrated in FIG. 3 is an observation matrix having 2 rows and 2 columns.

In this example, an example of an observation matrix (second observation matrix) generated in a case where 2 is input from the input unit 111 as the number of pixels of a target signal in a vertical direction and the number of pixels of the target signal in a horizontal direction is illustrated.

The observation matrix generation unit 114 generates the first observation matrix and the second observation matrix that have a determined size (in this example, 2 rows and 2 columns).

In a case where the observation matrix generation unit 114 generates the first observation matrix, a value of each matrix element is a value (0 in this example) used to bring a corresponding element into the restricted state.

In a case where the observation matrix generation unit 114 generates the second observation matrix, a value of each matrix element is a random number value according to a predetermined probability distribution. Specifically, for example, as many random number values according to the predetermined probability distribution as the number (4 in this example) of matrix elements of the second observation matrix are calculated on the basis of a random number seed generated by the random number seed generation unit 113, and the calculated values are used as values of the matrix elements of the second observation matrix.

In FIG. 3, each matrix element of the observation matrix has a value of 0 or 1.

Figure 4A:
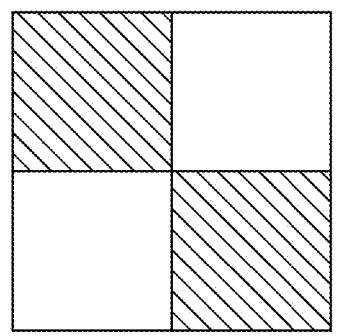
FIG. 4A is a diagram illustrating an example of how an observation matrix display unit having 2×2 pixels is controlled on the basis of an observation matrix having 2 rows and 2 columns illustrated in FIG. 3.

FIG. 4A is a diagram illustrating an example of a result obtained by controlling 2×2 pixels of the observation matrix display unit 115 on the basis of the observation matrix having 2 rows and 2 columns illustrated in FIG. 3. In the example of FIG. 4A, for example, 4 pixels that constitute the observation matrix display unit 115 are aligned in matrix of 2 rows and 2 columns. By controlling the states of the 4 elements, transmittance of corresponding pixels is controlled. In the example of FIG. 4A, the first number of rows and the first number of columns of the observation matrix are the same as the second number of rows and the second number of columns of the observation matrix display unit 115. Accordingly, the 4 matrix elements of the observation matrix and the 4 elements (pixels) of the observation matrix display unit 115 can be associated with each other on one-to-one basis. In this example, the control unit 112 associates a matrix element and an element that have the same row number and the same column number.

The control unit 112 associates the matrix elements of the second observation matrix and the elements of the observation matrix display unit 115 and controls the states of the elements of the observation matrix display unit 115 on the basis of values of corresponding matrix elements of the second observation matrix.

Figure 4B:
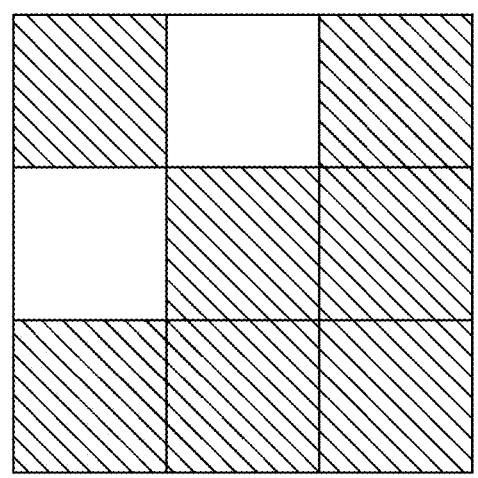
FIG. 4B is a diagram illustrating an example of a result obtained in a case where an observation matrix display unit having 3×3 pixels is controlled on the basis of an observation matrix having 2 rows and 2 columns illustrated in FIG. 3.

FIG. 4B is a diagram illustrating an example of a result obtained by controlling 3×3 pixels of the observation matrix display unit 115 on the basis of the observation matrix having 2 rows and 2 columns illustrated in FIG. 3. In the example of FIG. 4B, for example, 9 elements that constitute the observation matrix display unit 115 are arranged in a matrix of 3 rows and 3 columns. By controlling states of the 9 elements, transmittance of corresponding pixels is controlled.

In the example of FIG. 4B, the first number of rows and the first number of columns of the observation matrix are not the same as the second number of rows and the second number of columns of the observation matrix display unit 115. Accordingly, the control unit 112 associates 4 elements (also referred to as 2×2 elements) arranged in 2 rows and 2 columns in an upper left portion of the observation matrix display unit 115 and the 4 matrix elements of the observation matrix on one-to-one basis. The control unit 112 controls the states of a plurality of elements on right and lower ends of the observation matrix display unit 115 in which no corresponding matrix element exists to a predetermined state. The predetermined state is the restricted state (the non-transmission state).

The control unit 112 controls the states of the elements of the observation matrix display unit 115 on the basis of values of corresponding matrix elements of the second observation matrix.

Figure 4C:
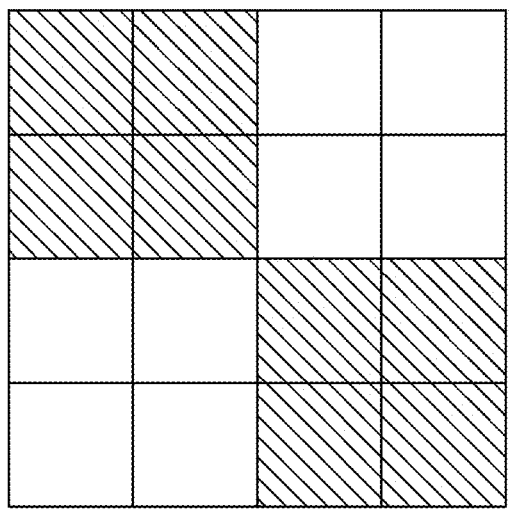
FIG. 4C is a diagram illustrating an example of a result obtained in a case where an observation matrix display unit having 4×4 pixels is controlled on the basis of an observation matrix having 2 rows and 2 columns illustrated in FIG. 3.

FIG. 4C is a diagram illustrating an example of a result obtained by controlling 4×4 pixels of the observation matrix display unit 115 on the basis of the observation matrix having 2 rows and 2 columns illustrated in FIG. 3. In the example of FIG. 4C, for example, 16 elements that constitute the observation matrix display unit 115 are arranged in a matrix of 4 rows and 4 columns. By controlling states of the 16 elements, transmittance of corresponding pixels is controlled.

In the example of FIG. 4C, the second number of rows and the second number of columns of the observation matrix display unit 115 are two times as large as the first number of rows and the second number of columns of the observation matrix. In this case, in a case where 2×2 elements of the observation matrix display unit 115 are regarded as a single group, it can be considered that 4 groups are arranged in a matrix of 2 rows and 2 columns in the observation matrix display unit 115.

In this way, the 4 groups of the observation matrix display unit 115 and the 4 matrix elements of the observation matrix can be associated with each other on one-to-one basis.

That is, the control unit 112 associates each matrix element of the observation matrix with a plurality of elements (2×2 elements in this example) included in a corresponding group.

Then, the control unit 112 controls states of a plurality of elements included in each group in accordance with a value of a corresponding matrix element of the observation matrix.

That is, the control unit 112 groups a plurality of elements of the observation matrix display unit 115 on the basis of the number of matrix elements included in the observation matrix and the number of elements of the observation matrix display unit 115 and changes the states of the elements on a group basis.

Grouping of the plurality of elements of the observation matrix display unit 115 is specifically described below.

Specifically, in a case where the second number of rows is larger than the first number of rows, the control unit 112 groups rows of the matrix of the plurality of elements of the observation matrix display unit 115 into groups each made up of rows whose number is based on the first number of rows and the second number of rows and equally controls state of elements in the same column included in the same group of rows. The number based on the first number of rows and the second number of rows is, for example, a quotient (2(=4/2) in this example) obtained when the second number of rows is divided by the first number of rows.

Furthermore, in a case where the second number of columns is larger than the first number of columns, the control unit 112 groups columns of the matrix of the plurality of elements of the observation matrix display unit 115 into groups each made up of columns whose number is based on the first number of columns and the second number of columns and equally controls states of elements in the same row included in the same group of columns. The number based on the first number of columns and the second number of columns is, for example, a quotient (2(=4/2) in this example) obtained when the second number of columns is divided by the first number of columns.

Figure 4D:
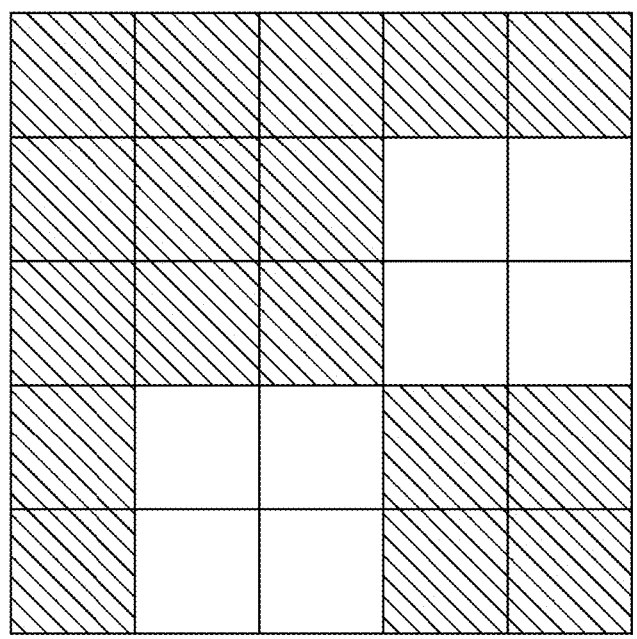
FIG. 4D is a diagram illustrating an example of a result obtained in a case where an observation matrix display unit having 5×5 pixels is controlled on the basis of an observation matrix having 2 rows and 2 columns illustrated in FIG. 3.

FIG. 4D is a diagram illustrating an example of a result obtained by controlling 5×5 pixels of the observation matrix display unit 115 on the basis of the observation matrix having 2 rows and 2 columns illustrated in FIG. 3. In the example of FIG. 4D, for example, 25 elements that constitute the observation matrix display unit 115 are arranged in a matrix of 5 rows and 5 columns. By controlling states of the 25 elements, transmittance of corresponding pixels is controlled.

In the example of FIG. 4D, the second number of rows and the second number of columns of the observation matrix display unit 115 are numbers obtained by doubling the first number of rows and the first number of columns of the observation matrix and adding 1 thereto, respectively. For example, elements other than a plurality of elements aligned in left and upper ends of the observation matrix display unit 115 illustrated in FIG. 4D are 4×4 elements. In this case, in a case where 2×2 elements are regarded as a single group in the part made up of the 4×4 elements, it can be considered that 4 groups are arranged in a matrix of 2 rows and 2 columns in the observation matrix display unit 115.

In this way, the 4 groups of the observation matrix display unit 115 and the 4 matrix elements of the observation matrix can be associated with each other on one-to-one basis.

That is, the control unit 112 associates each matrix element of the observation matrix with a plurality of elements (2×2 elements in this example) included in a corresponding group. The control unit 112 controls states of a plurality of elements on the left and upper ends of the observation matrix display unit 115 in which no corresponding matrix element exists to a predetermined state. The predetermined state is the restricted state (the non-transmission state).

The control unit 112 controls states of a plurality of elements included in each group in accordance with a value of a corresponding matrix element of the observation matrix.

Grouping of the plurality of elements of the observation matrix display unit 115 is specifically described below.

That is, in a case where a remainder is left when the second number of rows is divided by the first number of rows, the control unit 112 groups, into groups each made up of rows whose number is indicated by a quotient (2(=5/2) in this example), rows of the matrix of the plurality of elements of the observation matrix display unit 115 excluding a row whose number (1(=5%2) in this example where % is a remainder operator) is indicated by the remainder and controls states of elements included in the excluded row to the restricted state in which the volume of target signal to be transmitted to the observation unit 116 is restricted. Furthermore, in a case where a remainder is left when the second number of columns is divided by the first number of columns, the control unit 112 groups, into groups each made up of columns whose number is indicated by a quotient (2(=5/2) in this example), columns of the matrix of the plurality of elements of the observation matrix display unit 115 excluding a column whose number (1(=5%2) in this example) is indicated by the remainder and controls states of elements included in the excluded column to the restricted state in which the volume of target signal to be transmitted to the observation unit 116 is restricted.

Figure 4E:
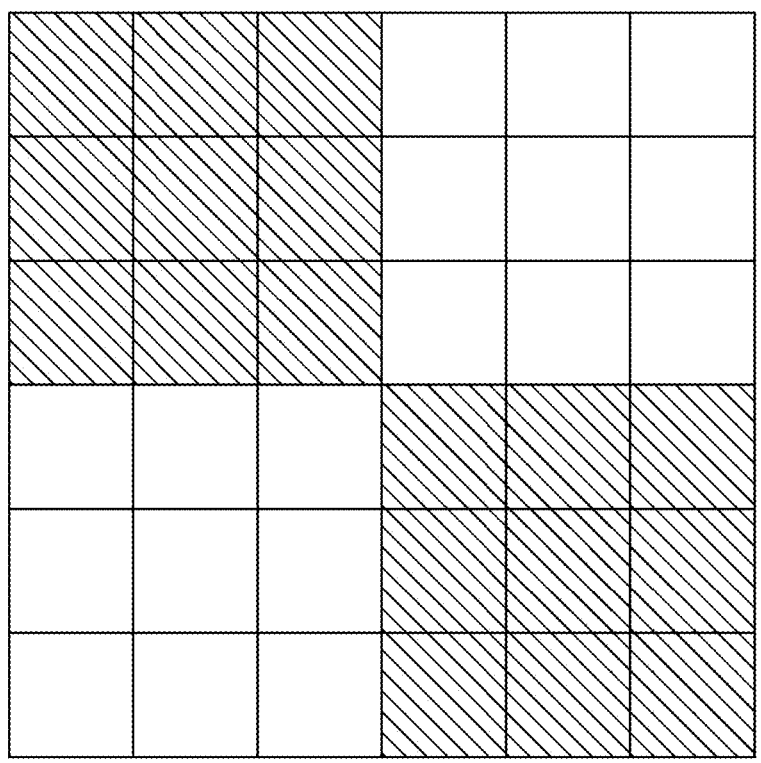
FIG. 4E is a diagram illustrating an example of a result obtained in a case where an observation matrix display unit having 6×6 pixels is controlled on the basis of an observation matrix having 2 rows and 2 columns illustrated in FIG. 3.

FIG. 4E is a diagram illustrating an example of a result obtained by controlling 6×6 pixels of the observation matrix display unit 115 on the basis of the observation matrix having 2 rows and 2 columns illustrated in FIG. 3. In the example of FIG. 4E, for example, 36 elements that constitute the observation matrix display unit 115 are arranged in a matrix of 6 rows and 6 columns. By controlling states of the 36 elements, transmittance of corresponding pixels is controlled.

In the example of FIG. 4E, the second number of rows and the second number of columns of the observation matrix display unit 115 are three times as large as the first number of rows and the second number of columns of the observation matrix. In this case, in a case where 3×3 elements of the observation matrix display unit 115 are regarded as a single group, it can be considered that 4 groups are arranged in a matrix of 2 rows and 2 columns in the observation matrix display unit 115.

In this way, the 4 groups of the observation matrix display unit 115 and the 4 matrix elements of the observation matrix can be associated with each other on one-to-one basis.

That is, the control unit 112 associates each matrix element of the observation matrix with a plurality of elements (3×3 elements in this example) included in a corresponding group.

Then, the control unit 112 controls states of a plurality of elements included in each group in accordance with a value of a corresponding matrix element of the observation matrix.

Note that FIGS. 4A through 4E illustrate an example of a result of control of the observation matrix display unit 115, and the present embodiment is not limited to this. The aforementioned idea can be applied as long as the first number of rows and the first number of columns of the observation matrix and the second number of rows and the second number of columns of the observation matrix display unit 115 can be specified, and thus states of elements that constitute the observation matrix display unit 115 can be controlled on the basis of the observation matrix.

Furthermore, for example, in FIGS. 4B and 4D, elements of the observation matrix display unit 115 that are associated with the matrix elements of the observation matrix need not necessarily be upper left or lower right elements of the observation matrix display unit 115. For example, instead of the upper left or lower right elements, upper right, lower left, or central elements of the observation matrix display unit 115 may be associated with the matrix elements of the observation matrix. Alternatively, elements of the observation matrix display unit 115 at positions designated by a user may be associated with the matrix elements of the observation matrix.

Note that the aforementioned description need just be applied in control of the elements of the observation matrix display unit 115 with the use of the first observation matrix.

The observation unit 116 is, for example, a single detector. The detector is constituted, for example, by an optical sensor (e.g., a photodiode). The observation unit 116 observes the volume of target signal transmitted via the observation matrix display unit 115 plural times. Specifically, the observation unit 116 measures (or observes) the volume of target signal transmitted to the observation unit 116 via the observation matrix display unit 115 every time the observation matrix display unit 115 is controlled by the first control or the second control. The volume of target signal that is measured by the observation unit 116 is referred to as an observation value of the target signal.

The communication unit 117 transmits, as a compressed signal to the signal restoration device 120, a difference value between an observation value of the target signal observed by using the first control and an observation value of the target signal observed by using the second control. Specifically, the communication unit 117 transmits, as a compressed signal to the signal restoration device 120, a difference value between an observation value of the target signal observed by the observation unit 116 when the observation matrix display unit 115 is controlled by the first control and an observation value of the target signal observed by the observation unit 116 when the observation matrix display unit 115 is controlled by the second control.

Furthermore, the communication unit 117 transmits, to the signal restoration device 120, a random number seed used for generation of the second observation matrix used in the second control together with the difference value. For example, the communication unit 117 transmits, to the signal restoration device 120, a data set including the difference value and the random number seed. Furthermore, the communication unit 117 transmits, to the signal restoration device 120, the first number of rows and the first number of columns of the observation matrix (or the number of vertical pixels and the number of horizontal pixels of the target signal) and the number of observations.

The signal restoration device 120 restores the target signal, for example, on the basis of the compressed signal and the random number seed received from the signal observation device 110. More specifically, the signal restoration device 120 restores the target signal on the basis of the compressed signal and the random number seed included in each of a plurality of data sets received from the signal observation device 110.

The signal restoration device 120 includes an input unit 121, a control unit 122, a communication unit 123, a restoration matrix generation unit 124, a restoration unit 125, and an output unit 126.

The input unit 121 receives user's input and transmits the input to the control unit 122. The input unit 121 is, for example, a keyboard or a touch panel.

The control unit 122 obtains information from the input unit 121 and controls the communication unit 123, the restoration matrix generation unit 124, the restoration unit 125, and the output unit 126. Note that the control unit 122 may be realized in any way as long as the control unit 122 has a control function, as in the case of the control unit 112.

The communication unit 123 receives information including a compressed signal from the signal observation device 110. Specifically, the communication unit 123 receives the number of pixels of the target signal (the first number of rows and the first number of columns of the observation matrix) and the number of observations from the signal observation device 110. Furthermore, the communication unit 123 receives a plurality of data sets each including a random number seed and a difference value from the signal observation device 110.

The restoration matrix generation unit 124 generates a plurality of second observation matrices on the basis of the number of pixels of the target signal, the number of observations, and random number seeds included in the respective plurality of data sets. The restoration matrix generation unit 124 generates second observation matrices that are identical to the plurality of second observation matrices generated by the observation matrix generation unit 114 of the signal observation device 110. That is, the restoration matrix generation unit 124 can generate a second observation matrix that is identical to that generated by the observation matrix generation unit 114 on the basis of the same random number seed. Then, the restoration matrix generation unit 124 generates a restoration matrix for restoring the target signal from the compressed signal by using the generated plurality of second observation matrices.

The restoration unit 125 restores the target signal on the basis of the restoration matrix generated by the restoration matrix generation unit 124, the first number of rows and the first number of columns of the observation matrices, the number of observations, the difference values included as compressed signals in the respective plurality of data sets, and a basis matrix. The basis matrix is a basis matrix in a space where the target signal observed by the signal observation device 110 exhibits sparsity. Note that a known method such as a simplex method or an interior point method that is widely used in compressed sensing may be used as the restoration process (see, for example, Non-Patent Literature 1).

The output unit 126 outputs the target signal restored by the restoration unit 125.

The configuration of a compressed signal observation system according to the present embodiment has been described above.

Operation of Signal Observation System

Next, an operation of the signal observation system according to the present embodiment is specifically described with reference to FIGS. 5 through 12.

Signal Observation Process

First, a signal observation process performed by the signal observation device 110 is specifically described with reference to FIGS. 5 through 9C.

Figure 5:
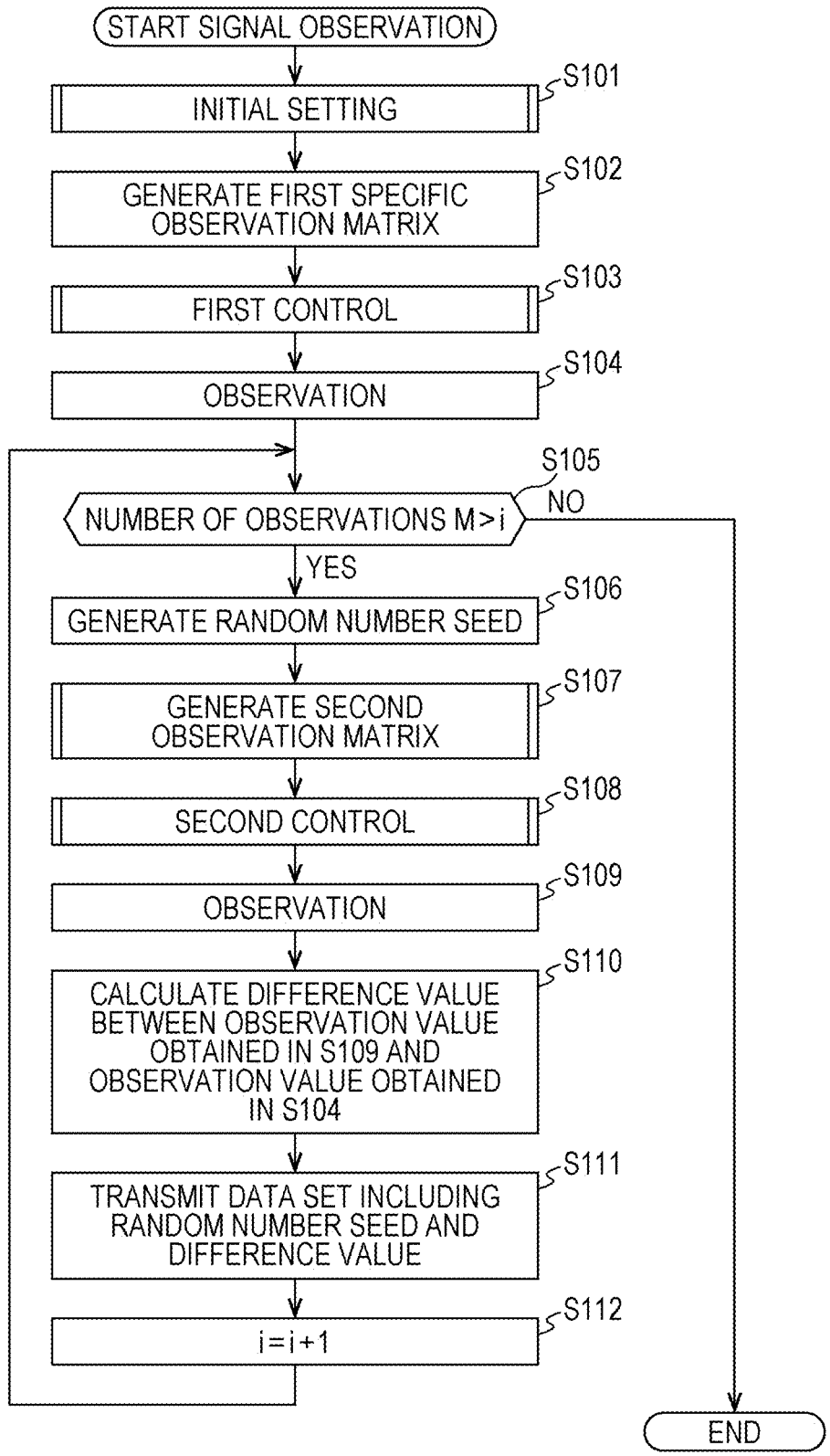
FIG. 5 is a flow chart illustrating an example of a signal observation process performed by a signal observation device according to Embodiment 1.

FIG. 5 is a flow chart illustrating an example of the signal observation process performed by the signal observation device 110. FIG. 6 is a flow chart illustrating an example of an initial setting process of the signal observation device 110. Specifically, FIG. 6 illustrates details of Step S101 of FIG. 5.

As illustrated in FIG. 5, the signal observation device 110 performs an initial setting process for signal observation (S101). Specifically, as illustrated in FIG. 6, the control unit 112 receives user's input of the number of horizontal pixels (hereinafter referred to as DevW) and the number of vertical pixels (hereinafter referred to as DevH) of the observation matrix display unit 115 via the input unit 111 and thus sets DevW and DevH (S201). DevW corresponds to the number of columns (the second number of columns) of a plurality of elements arranged in a matrix that constitutes the observation matrix display unit 115. DevH corresponds to the number of rows (the second number of rows) of the plurality of elements arranged in a matrix that constitutes the observation matrix display unit 115.

Furthermore, the control unit 112 receives user's input of the number of vertical pixels (hereinafter referred to as PicH) and the number of horizontal pixels (hereinafter referred to as PicW) of the target signal via the input unit 111 and thus sets PicH and PicW (S202). PicW corresponds to the number of columns (the first number of columns) of an observation matrix, and PicH corresponds to the number of rows (the first number of rows) of the observation matrix.

Furthermore, the control unit 112 receives user's input of a compression ratio (hereinafter referred to as $\rho$) via the input unit 111 and thus sets $\rho$ (S203). The control unit 112 calculates the number of observations (hereinafter referred to as M) from PicH, PicW, and $\rho$ and thus sets M (S204).

Then, the communication unit 117 transmits PicH, PicW, and M to the signal restoration device 120 (S205). The control unit 112 initializes a value of an observation number counter i for counting the number of observations to 0 (S206).

After such an initial setting process, the observation matrix generation unit 114 generates a first observation matrix (S102). The first observation matrix is a matrix having PicW rows and PicH columns in which all matrix elements have a value of 0.

The control unit 112 associates the matrix elements of the generated first observation matrix and the elements that constitute the observation matrix display unit 115. The associating process has been described above with reference to FIGS. 3 and 4A through 4E. Note that in a case where there is an element of the observation matrix display unit 115 that is not associated with any matrix element of the first observation matrix, the control unit 112 controls the state of this element to a predetermined state. The predetermined state is the restricted state (non-transmission state).

The control unit 112 controls the pixels of the observation matrix display unit 115 on the basis of the first observation matrix (S103).

Controlling the pixels of the observation matrix display unit 115 means controlling transmittance of the pixels by controlling corresponding elements of the observation matrix display unit 115 on the basis of the first observation matrix.

The control of the elements of the observation matrix display unit 115 based on the first observation matrix in Step S103 is referred to as first control. For example, in a case where values of the matrix elements that constitute the first observation matrix are uniformly 0, the control unit 112 controls the states of the elements that correspond to the respective pixels of the observation matrix display unit 115 to the restricted state. The observation unit 116 observes the target signal transmitted via the observation matrix display unit 115 while the observation matrix display unit 115 is being controlled by the first control in Step S103 (S104).

Next, the control unit 112 controls the elements of the observation matrix display unit 115 on the basis of a second observation matrix. Specifically, the control unit 112 compares the number of observations M and the observation number counter i (S105). In a case where i is equal to or larger than M (N in S105), the signal observation device 110 finishes the signal observation process.

In a case where i is smaller than M (Y in S105), the random number seed generation unit 113 generates a random number seed (S106). Next, the observation matrix generation unit 114 generates the second observation matrix having PicW rows and PicH columns in which values of matrix elements are random number values calculated on the basis of the random number seed (S107). The control unit 112 associates the matrix elements of the generated second observation matrix and the elements that constitute the observation matrix display unit 115. The associating process has been described above with reference to FIGS. 3 and 4A through 4E. The control unit 112 controls the elements of the observation matrix display unit 115 on the basis of values of the matrix elements of the generated second observation matrix. Note that in a case where there is an element of the observation matrix display unit 115 that is not associated with any matrix element of the second observation matrix, the control unit 112 controls the state of this element to the restricted state (non-transmission state) (S108). The control of the elements of the observation matrix display unit 115 based on the second observation matrix in Step S108 is referred to as second control. The observation unit 116 observes the target signal transmitted via the observation matrix display unit 115 while the states of the elements of the observation matrix display unit 115 are being controlled by the second control in Step S108 (S109). The control unit 112 calculates a difference value by subtracting an observation value of the target signal observed in Step S104 from an observation value of the target signal observed in Step S109 (S110). The communication unit 117 transmits, to the signal restoration device 120, a data set including the random number seed generated in Step S106 and the difference value calculated in Step S110 (S111). Then, the value of the observation number counter i is incremented (S112), and the process returns to Step S105.

Note that Steps S105 through S112 are repeatedly performed until the observation number counter i becomes equal to or larger than the number of observations M, and as a result, M second observation matrices are generated. Accordingly, M data sets are transmitted to the signal restoration device 120.

In a case where different random number seeds are generated by performing Step S106 repeatedly, it can be anticipated that the generated M second observation matrices are different from each other.

The aforementioned procedure is a procedure of the signal observation process performed by the signal observation device 110 illustrated in FIG. 5. In the present embodiment, the first control is applied in the first one of the plural observations as illustrated in FIG. 5.

FIG. 7 is a flow chart illustrating an example of an observation matrix generation process performed by the observation matrix generation unit 114. Specifically, FIG. 7 illustrates details of Step S107 of FIG. 5.

As illustrated in FIG. 7, the observation matrix generation unit 114 calculates the total number N of matrix elements of the second observation matrix by using the number of vertical pixels PicH and the number of horizontal pixels PicW of the target signal that are received from the input unit 111 (S301). Next, the observation matrix generation unit 114 generates N random numbers each having a value of 0 or 1 according to a Bernoulli distribution by using the random number seed generated by the random number seed generation unit 113 (S302). Then, the observation matrix generation unit 114 generates the second observation matrix having PicW rows and PicH columns by arranging the generated N random numbers in a raster order (S303).

Although the observation matrix generation unit 114 generates random numbers according to a Bernoulli distribution in the present embodiment, the observation matrix generation unit 114 may generate random numbers according to a normal distribution or another probability distribution. Furthermore, although the value of the random numbers is 0 or 1 in the present embodiment, the random numbers may have another value.

The aforementioned procedure is a procedure of the observation matrix generation process performed by the observation matrix generation unit 114 illustrated in FIG. 7.

FIG. 8 is a flow chart illustrating an example of a process for controlling the observation matrix display unit 115. Specifically, FIG. 8 illustrates details of Step S103 and Step S108 of FIG. 5.

As illustrated in FIG. 8, the control unit 112 calculates the number of duplications in a horizontal direction (hereinafter referred to as NumW) of matrix elements of the observation matrix by using the number of horizontal pixels DevW of the observation matrix display unit 115 and the number of horizontal pixels PicW of the target signal that are received from the input unit 111. Similarly, the control unit 112 calculates the number of duplications in a vertical direction (hereinafter referred to as NumH) of the elements of the observation matrix by using the number of vertical pixels DevH of the observation matrix display unit 115 and the number of vertical pixels PicH of the target signal (S401).

Next, the control unit 112 initializes a counter j indicative of a row number of an element of the observation matrix to be processed to 0 (S402). Next, the control unit 112 determines whether or not the counter j is smaller than the number of vertical pixels PicH of the target signal (S403).

In a case where the counter j is equal to or larger than the number of vertical pixels PicH (N in S403), the observation matrix display unit 115 finishes the control process. Meanwhile, in a case where the counter j is smaller than the number of vertical pixels PicH (Y in S403), a counter ii indicative of a column number of an element of the observation matrix to be processed is initialized To 0 (S404). Next, it is determined whether or not the counter ii is smaller than the number of horizontal pixels PicW of the target signal (S405).

In a case where the counter ii is equal to or larger than the number of horizontal pixels PicW (N in S405), the counter j is incremented (S412) and the process returns to Step S403. Meanwhile, in a case where the counter ii is smaller than the number of horizontal pixels PicW (Y in S405), the control unit 112 initializes a counter m for the number of duplications in the vertical direction of the pixels of the observation matrix display unit 115 to 0 (S406). Next, the control unit 112 determines whether or not the counter m is smaller than NumH (S407).

In a case where the counter m is equal to or larger than NumH (N in S407), the counter ii is incremented (S413) and the process returns to Step S405. Meanwhile, in a case where the counter m is smaller than NumH (Y in S407), the control unit 112 initializes a counter n for the number of duplications in the horizontal direction of the pixels of the observation matrix display unit 115 to 0 (S408). Next, the control unit 112 determines whether or not the counter n is smaller than NumW (S409).

In a case where the counter n is equal to or larger than NumW (N in S409), the counter m is incremented (S414) and the process returns to Step S407. Meanwhile, in a case where the counter n is smaller than NumW (Y in S409), a pixel (or a state of an element) of a (j×NumH+m)th row and an (ii×NumW+n)th column of the observation matrix display unit 115 is controlled by using a value of an element of a j-th row and an ii-th column of the observation matrix (the first observation matrix or the second observation matrix) (S410). Next, the counter n is incremented (S411) and the process returns to Step S409.

The aforementioned procedure is a procedure of the process for controlling the observation matrix display unit 115 illustrated in FIG. 8. Through the aforementioned process, the elements of the observation matrix display unit 115 are controlled by applying the method described with reference to FIGS. 4A through 4E in accordance with a relationship between the first number of rows and the first number of columns of the observation matrix and the second number of rows and the second number of columns of the pixels of the observation matrix display unit 115.

Figure 9A:
FIG. 9A is a diagram illustrating an example of a result obtained in a case where the observation matrix display unit is controlled on the basis of a second observation matrix according to Embodiment 1.
Figure 9B:
FIG. 9B is a diagram illustrating an example of a result obtained in a case where the observation matrix display unit is controlled on the basis of a first observation matrix according to Embodiment 1.

FIG. 9A is a diagram illustrating an example of a result of control of the observation matrix display unit 115 based on the second observation matrix. FIG. 9B is a diagram illustrating an example of a result of control of the observation matrix display unit 115 based on the first observation matrix.

In FIGS. 9A and 9B, the observation matrices (the first observation matrix and the second observation matrix) have matrix elements of 64 rows and 64 columns. The observation matrix display unit 115 has pixels of 64 rows and 64 columns. That is, a plurality of elements that constitute the observation matrix display unit 115 are arranged in a matrix of 64 rows and 64 columns.

Accordingly, the matrix elements of each of the observation matrices and the pixels of the observation matrix display unit 115 correspond to each other on one-to-one basis. In FIGS. 9A and 9B, in a case where a value of a matrix element is "0", a corresponding pixel of the observation matrix display unit 115 is in the restricted state and does not allow transmission of visible light and is therefore expressed by black. In a case where a value of a matrix element is "1", a corresponding pixel of the observation matrix display unit 115 is in the non-restricted state and allows transmission of visible light and is therefore expressed by white.

Note that a correspondence between a value of a matrix element and a state of a pixel is not limited to this. For example, "0" may correspond to the non-restricted state, and "1" may correspond to the restricted state.

Figure 9C:
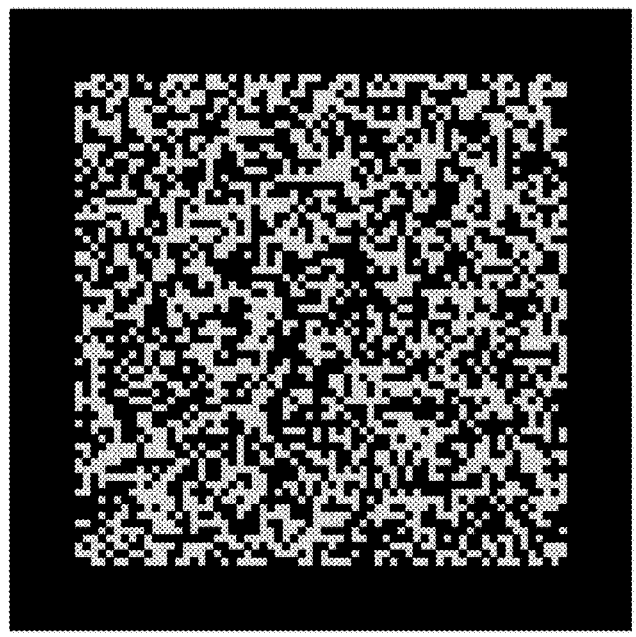
FIG. 9C is a diagram illustrating another example of a result obtained in a case where the observation matrix display unit is controlled on the basis of the second observation matrix according to Embodiment 1.

FIG. 9C is a diagram illustrating another example of a result of control of the observation matrix display unit 115 based on the second observation matrix. In FIG. 9C, the observation matrices (the first observation matrix and the second observation matrix) have 64 rows and 64 columns as in FIG. 9A. Meanwhile, the observation matrix display unit 115 has pixels of 700 rows and 700 columns. In this example, 640×640 pixels in a central part of the observation matrix display unit 115 are associated with 64×64 matrix elements of each of the observation matrices.

Signal Restoration Process

Next, a signal restoration process in the signal restoration device 120 is specifically described with reference to FIGS. 10 through 12.

Figure 10:
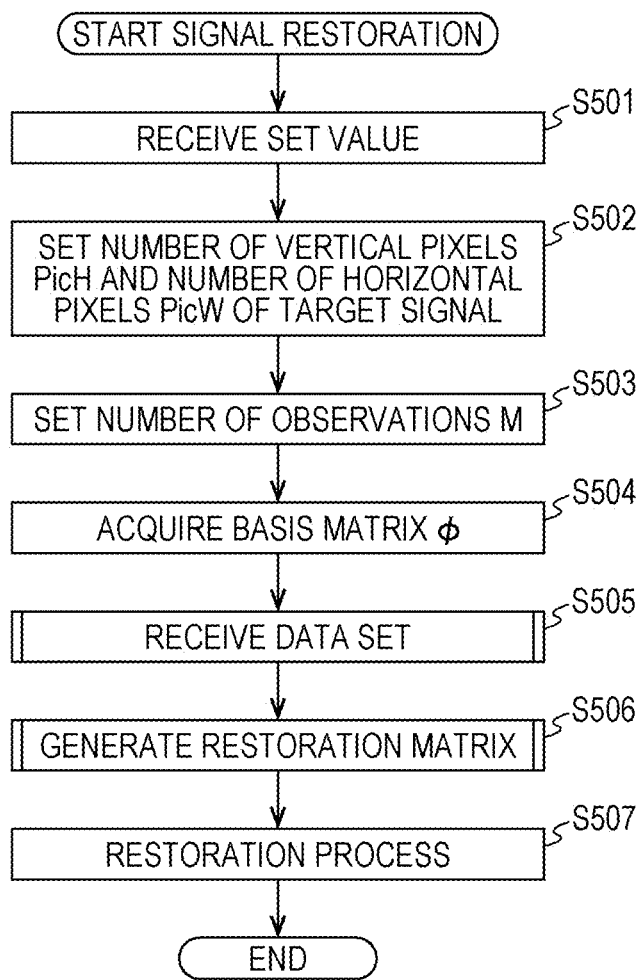
FIG. 10 is a flow chart illustrating an example of a signal restoration process performed by a signal restoration device according to Embodiment 1.

FIG. 10 is a flow chart illustrating an example of the signal restoration process performed by the signal restoration device 120.

As illustrated in FIG. 10, the communication unit 123 receives a setting value from the signal observation device 110 (S501). Specifically, the communication unit 123 receives, from the signal observation device 110, the number of vertical pixels PicH and the number of horizontal pixels PicW of the target signal and the number of observations M. Next, the control unit 122 sets PicH and PicW (S502). Furthermore, the control unit 122 sets the number of observations M received from the signal observation device 110 (S503).

Then, the control unit 122 acquires, from the input unit 121, a basis matrix φ for projection into a space where the target signal exhibits sparsity (S504). Note that the basis matrix φ need not necessarily be acquired from the input unit 121, and the basis matrix φ may be stored in advance in the control unit 122. The basis matrix φ is, for example, a discrete cosine transform basis or a Fourier transform basis.

Next, the communication unit 123 receives a data set from the signal observation device 110 (S505). Next, the restoration matrix generation unit 124 generates a restoration matrix on the basis of the received data set (S506). Then, the restoration unit 125 performs a restoration process by using the data set received in Step S504 and the restoration matrix generated in Step S506 (S507).

Specifically, the restoration unit 125 restores a target signal e on the basis of s=Fe where s is an observation vector (i.e., a compressed signal) made up of a plurality of observation values included in a received plurality of data sets, and F is a restoration matrix.

The target signal e need not necessarily be a sparse signal. In a case where the target signal e is not sparse, the target signal e need be given sparsity by projecting the target signal e into a space where the target signal e exhibits sparsity by using the basis matrix φ. Specifically, the target signal e is converted into e' having sparsity in accordance with e'=φe. That is, when s=Fe=(Fφ$^{-1}$) e', even the target signal e that does not have sparsity can be converted into a signal e' having sparsity by using the basis matrix φ and the sparsity can be used for restoration of the signal where φ$^{-1}$ is an inverse matrix of the basis matrix φ. In this way, the restoration unit 125 restores the target signal e by solving s=Fe=(Fφ$^{-1}$) e' by using sparsity of the target signal e' obtained after basis conversion.

The aforementioned procedure is a procedure of the signal restoration process performed by the signal restoration device 120 illustrated in FIG. 10.

Figure 11:
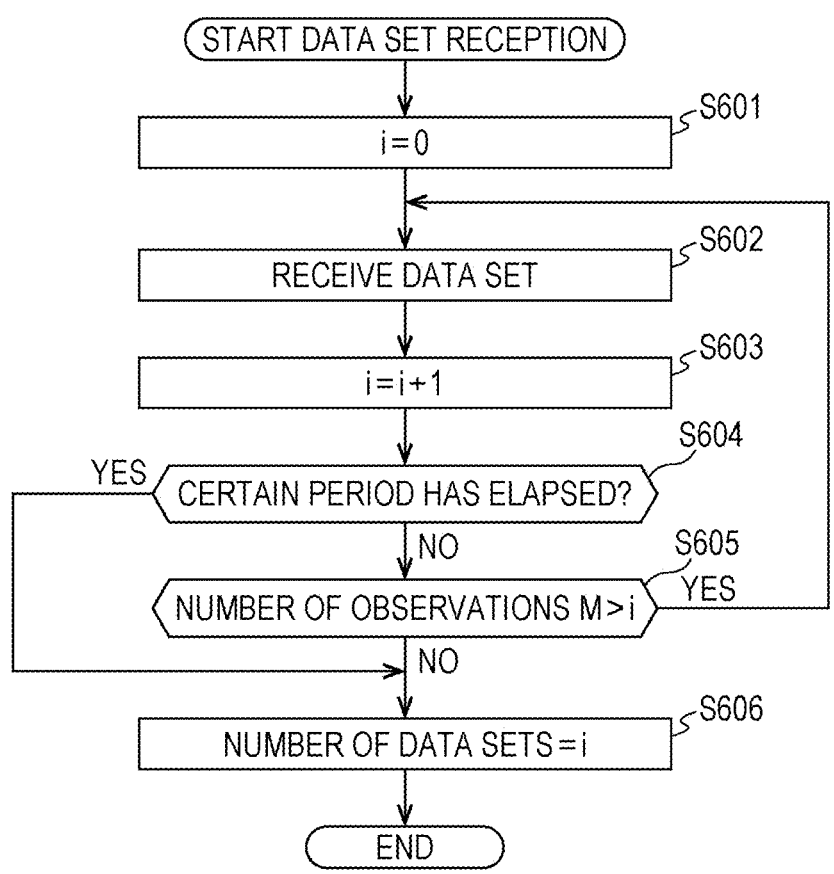
FIG. 11 is a flow chart illustrating an example of a data set receiving process performed by a communication unit of the signal restoration device according to Embodiment 1.

FIG. 11 is a flow chart illustrating an example of a data set receiving process performed by the communication unit 123. Specifically, FIG. 11 illustrates details of Step S505 of FIG. 10.

As illustrated in FIG. 11, first, the communication unit 123 initializes the counter i for counting the number of data sets received from the signal observation device 110 to 0 (S601). Next, the communication unit 123 receives a data set (S602). The data set includes a random number seed used for generation of the second observation matrix in the observation unit 116 of the signal observation device 110 and a difference value between an observation value observed by using the second observation matrix and an observation value observed by using the first observation matrix.

Then, the communication unit 123 increments the counter i (S603). Next, the communication unit 123 determines whether or not a certain period has elapsed from reception of a previous data set (S604). The certain period is a threshold period for which the communication unit 123 waits for reception of a data set. The certain period may be one that is input by a user with the use of the input unit 121 or may be one that is preset by the control unit 122.

In a case where the certain period has not elapsed (N in S604), it is determined whether or not the number of observations M that matches the number of data sets to be received is larger than the counter i (S605). In a case where M is equal to or lower than i (N in S605) or in a case where the certain period has elapsed (Y in S604), the communication unit 123 sets the counter i as the number of actually received data sets (S606). In a case where M is larger than i (Y in S605), the process returns to Step S602.

The aforementioned procedure is a procedure of the data set receiving process performed by the communication unit 123.

Figure 12:
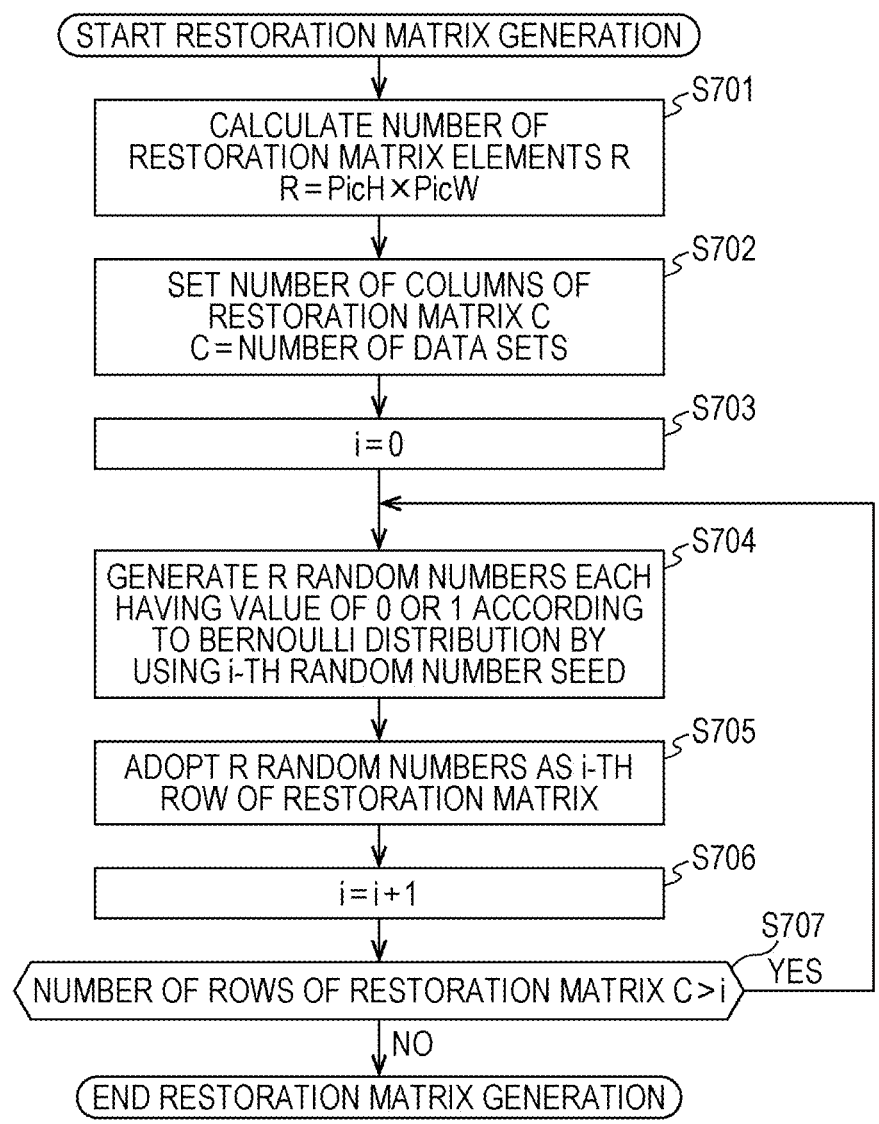
FIG. 12 is a flow chart illustrating a restoration matrix generation process performed by a restoration matrix generation unit of the signal restoration device according to Embodiment 1.

FIG. 12 is a flow chart illustrating an example of a restoration matrix generation process performed by the restoration matrix generation unit 124. Specifically, FIG. 12 illustrates details of Step S506 of FIG. 10.

As illustrated in FIG. 12, the restoration matrix generation unit 124 calculates the number of columns R of the restoration matrix from the number of vertical pixels PicH and the number of horizontal pixels PicW of the target signal that are received by the communication unit 123 (S701). In this example, it is assumed that the number of columns R of the restoration matrix is PicH×PicW. The restoration matrix generation unit 124 sets, as the number of rows C of the restoration matrix, the number of data sets that is set in Step S605 of FIG. 11 (S702).

Next, the restoration matrix generation unit 124 initializes the counter i for counting the number of rows of the restoration matrix to 0 (S703). Next, the restoration matrix generation unit 124 generates R random numbers each having a value of 0 or 1 according to a Bernoulli distribution by using a random number seed included in an i-th data set received by the communication unit 123 (S704). The restoration matrix generation unit 124 adopts the generated R random numbers as an i-th row of the restoration matrix (S705). Then, the restoration matrix generation unit 124 increments the counter i (S706). Next, the restoration matrix generation unit 124 determines whether or not the counter i is smaller than the number of rows C of the restoration matrix (S707). In a case where the counter i is equal to or larger than the number of rows C of the restoration matrix (N in S707), the restoration matrix generation process is finished. In a case where the counter i is smaller than the number of rows C of the restoration matrix (Y in S707), the process returns to Step S704.

The aforementioned procedure is a procedure of the restoration matrix generation process performed by the restoration matrix generation unit 124 illustrated in FIG. 12.

A result of test using the signal observation system 100 is described below with reference to FIGS. 13A and 13B.

Figure 13A:
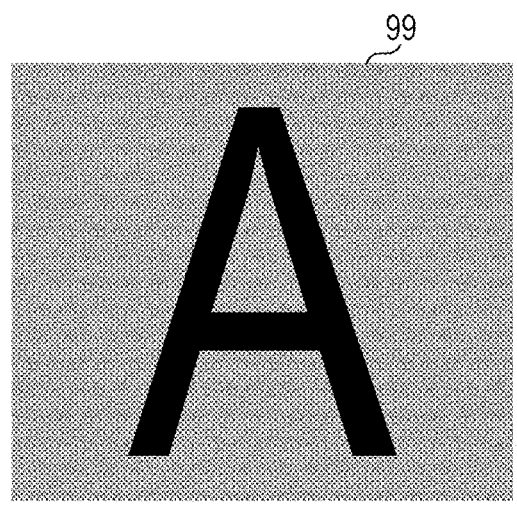
FIG. 13A is a diagram illustrating a subject used in a test.
Figure 13B:
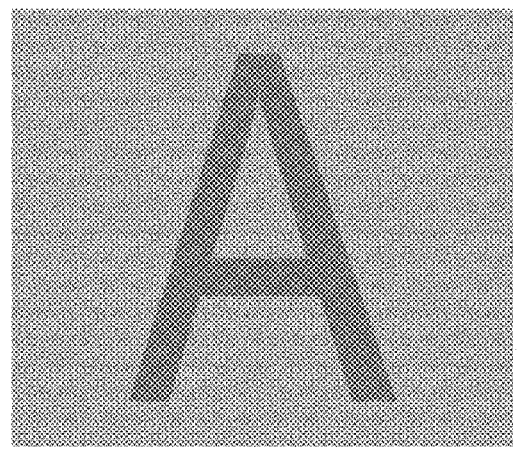
FIG. 13B is a diagram illustrating an image restored in the test.

FIG. 13A is a diagram illustrating a subject 99 used in the test. FIG. 13B is a diagram illustrating an image restored in the test. In the test, a character "A" is illustrated on the subject 99 as illustrated in FIG. 13A. Light from the subject 99 was observed plural times by the observation unit 116 via the observation matrix display unit 115 controlled as illustrated in FIG. 9C. The image of the subject 99 was restored as illustrated in FIG. 13B by using a difference value between each of a plurality of observation values obtained by a plurality of observations using a plurality of second observation matrices and an observation value obtained by an observation using the first observation matrix.

Effects

As described above, according to the signal observation system 100 of the present embodiment, a target signal can be observed plural times by selectively using the first control using the first observation matrix having a predetermined pattern and the second control using the second observation matrix based on a random number seed. Since a difference value between an observation value of the target signal obtained by the first control and an observation value of the target signal obtained by the second control can be calculated, it is possible to restore the target signal by using the difference value. As a result, it is possible to restore the target signal by emphasizing a change in observation value obtained by an observation matrix during a plurality of observations, thereby keeping a degradation of a signal caused by noise low.

Furthermore, according to the signal observation system 100 of the present embodiment, the first control can be applied in the initial observation. Since an observation value has been already obtained by the first control in a subsequent observation using the second control, a difference value can be obtained promptly. This can reduce a buffer for observation values.

Furthermore, according to the signal observation system 100 of the present embodiment, a difference value can be calculated in the signal observation device 110. This makes it unnecessary for the signal restoration device 120 to calculate a difference value, thereby making it easy to restore a target signal. Furthermore, it is possible to reduce the volume of communication from the signal observation device 110 to the signal restoration device 120.

Furthermore, according to the signal observation system 100 of the present embodiment, it is possible to change states of a plurality of elements on the basis of a plurality of observation matrices each having a size determined by the first number of rows and the first number of columns obtained from the input unit. Accordingly, the size of each observation matrix is not limited to the number of rows and the number of columns of the observation matrix display unit 115 and can be freely set. The number of pixels of the target signal depends on the size of the observation matrix. Accordingly, the number of pixels of a target signal can be freely set without depending on the number of pixels of the observation matrix display unit 115. It is therefore possible to improve flexibility of observation.

Furthermore, according to the signal observation system 100 of the present embodiment, even in a case where the number of matrix elements of an observation matrix and the number of elements (pixels) of the observation matrix display unit 115 are different from each other, the elements of the observation matrix display unit 115 can be controlled on the basis of the observation matrix by grouping the elements of the observation matrix display unit 115 and controlling states of the elements on a group basis. As a result, the target signal can be restored with any number of pixels. It is therefore possible to improve flexibility of observation.

Furthermore, according to the signal observation system 100 of the present embodiment, it is possible to transmit, from the signal observation device 110 to the signal restoration device 120, a data set including a random number seed and a different value (compressed signal) obtained by subtracting the volume of target signal observed by the observation unit 116 while the elements of the observation matrix display unit 115 are being controlled on the basis of the first observation matrix from the volume of target signal observed by the observation unit 116 while the elements of the observation matrix display unit 115 are being controlled on the basis of the second observation matrix generated on the basis of the random number seed. Furthermore, a plurality of second observation matrices that are different from each other in terms of values of matrix elements can be generated by generating the second observation matrices on the basis of different random number seeds. A plurality of data sets each including a random number seed and a difference value can be transmitted from the signal observation device 110 to the signal restoration device 120. Therefore, even in a case where one or some of the data sets are lost during communication, a restoration matrix can be generated by using only a data set successfully received. It is therefore possible to improve error resistance.

Furthermore, according to the signal observation system 100 of the present embodiment, a random number seed used to generate a second observation matrix can be transmitted instead of transmitting the second observation matrix. It is therefore possible to save the volume of communication and capacity of storage for the observation matrix.

Embodiment 2

Next, Embodiment 2 is described below. The present embodiment is different from Embodiment 1 in that first control based on a first observation matrix having a predetermined pattern is applied in a middle one of a plurality of observations. Differences of the present embodiment from Embodiment 1 are mainly described below.

A configuration of a signal observation system according to the present embodiment is substantially identical to that of the signal observation system according to Embodiment 1 illustrated in FIG. 2, and therefore illustration and description thereof are omitted.

Operation of Signal Observation System

An operation of a compressed signal observation system according to the present embodiment is specifically described below with reference to FIG. 14.

Figure 14:
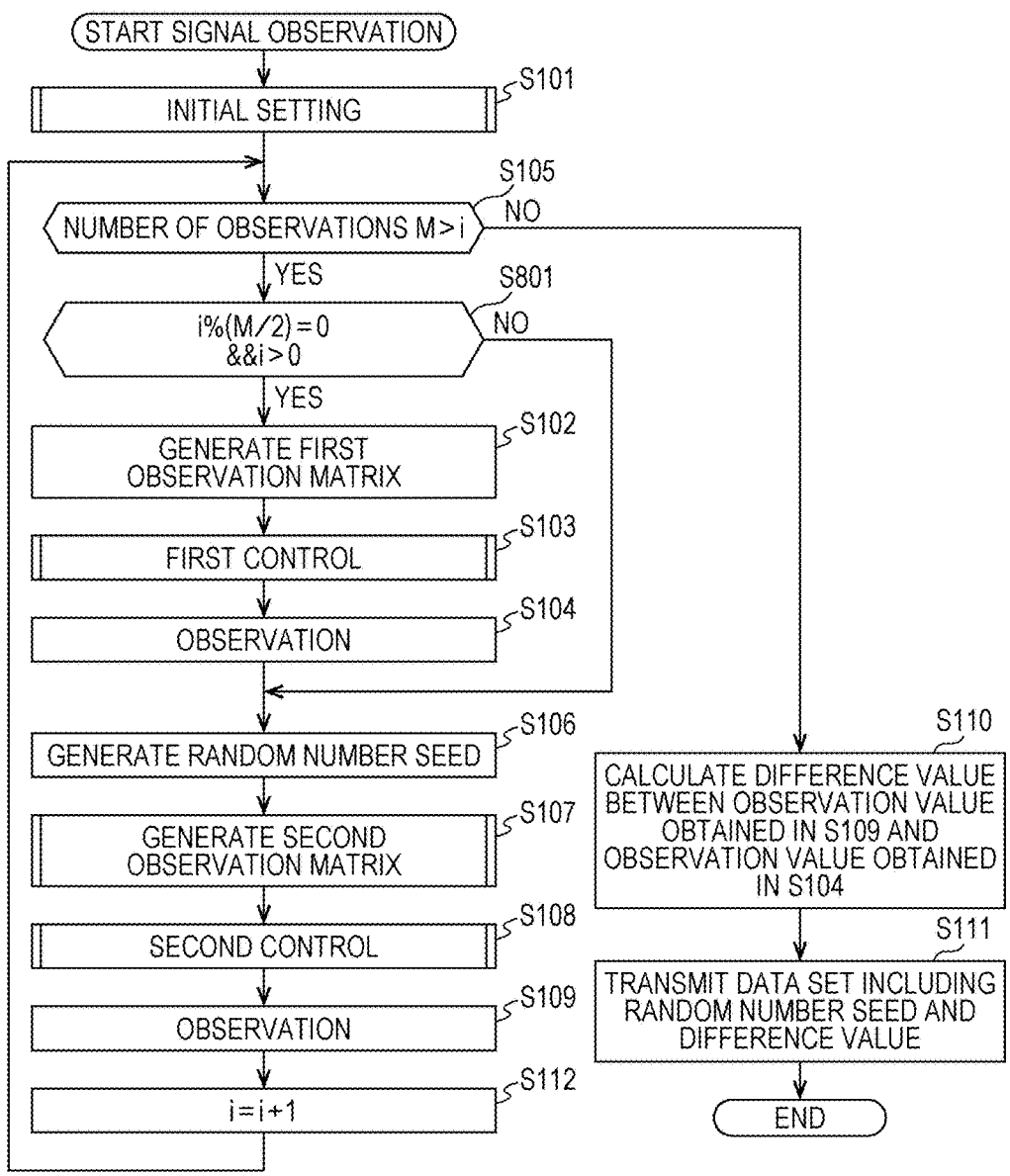
FIG. 14 is a flow chart illustrating an example of a signal observation process performed by a signal observation device according to Embodiment 2.

FIG. 14 is a flow chart illustrating an example of a signal observation process performed by a signal observation device 110 according to Embodiment 2. In FIG. 14, steps that are identical or similar to those in FIG. 5 are given identical reference signs, and description thereof is omitted as appropriate.

After initial setting (S101), a control unit 112 compares the number of observations M and an observation number counter i (S105). In a case where i is smaller than M (Y in S105), the control unit 112 determines whether or not a remainder obtained when the observation number counter i is divided by half of the number of observations M is 0 and i is larger than 0 (S801). That is, the control unit 112 determines whether or not an i-th observation is a middle one of the M observations.

In a case where the remainder obtained when the observation number counter i is divided by half of the number of observations M is 0 and i is larger than 0 (Y in S801), a process for an observation using a first observation matrix is performed (S102 through S104). Meanwhile, in a case where the remainder obtained when the observation number counter i is divided by half of the number of observations M is not 0 or i is 0 (N in S801), the process for an observation using a first observation matrix is skipped, and a process for an observation using a second observation matrix is performed (S106 through S109). That is, in a case where M is an even number, an (M/2)th one of the M observations is an observation using the first observation matrix. That is, the first control is applied in a middle one of a plurality of observations. Then, the value of the observation number counter i is incremented (S112) and the process returns to Step S105.

In a case where i is equal to or larger than M (N in S105), the control unit 112 calculates M difference values by subtracting an observation value of a target signal observed in Step S104 from each of observation values of the target signal observed M times in Step S109 (S110). A communication unit 117 transmits, to a signal restoration device 120, M data sets each including a random number seed generated in Step S106 and a difference value calculated in Step S110 (S111).

The aforementioned procedure is a procedure of the signal observation process performed by the signal observation device 110 illustrated in FIG. 14.

Effects

According to the signal observation device 110 of the present embodiment, the first control can be applied in a middle observation. It is therefore possible to calculate a difference value between observation values obtained in observations that are closer in time to each other than in Embodiment 1, thereby making influence of noise caused by a temporal change low.

Embodiment 3

Next, Embodiment 3 is described below. The present embodiment is different from Embodiment 1 in that first control based on a first observation matrix having a predetermined pattern is applied in every predetermined number of observations among a plurality of observations. Differences of the present embodiment from Embodiment 1 are mainly described below.

A configuration of a signal observation system according to the present embodiment is substantially identical to that of the signal observation system according to Embodiment 1 illustrated in FIG. 2, and therefore illustration and description thereof are omitted.

Operation of Signal Observation System

An operation of a signal observation system according to the present embodiment is specifically described below with reference to FIG. 15.

Figure 15:
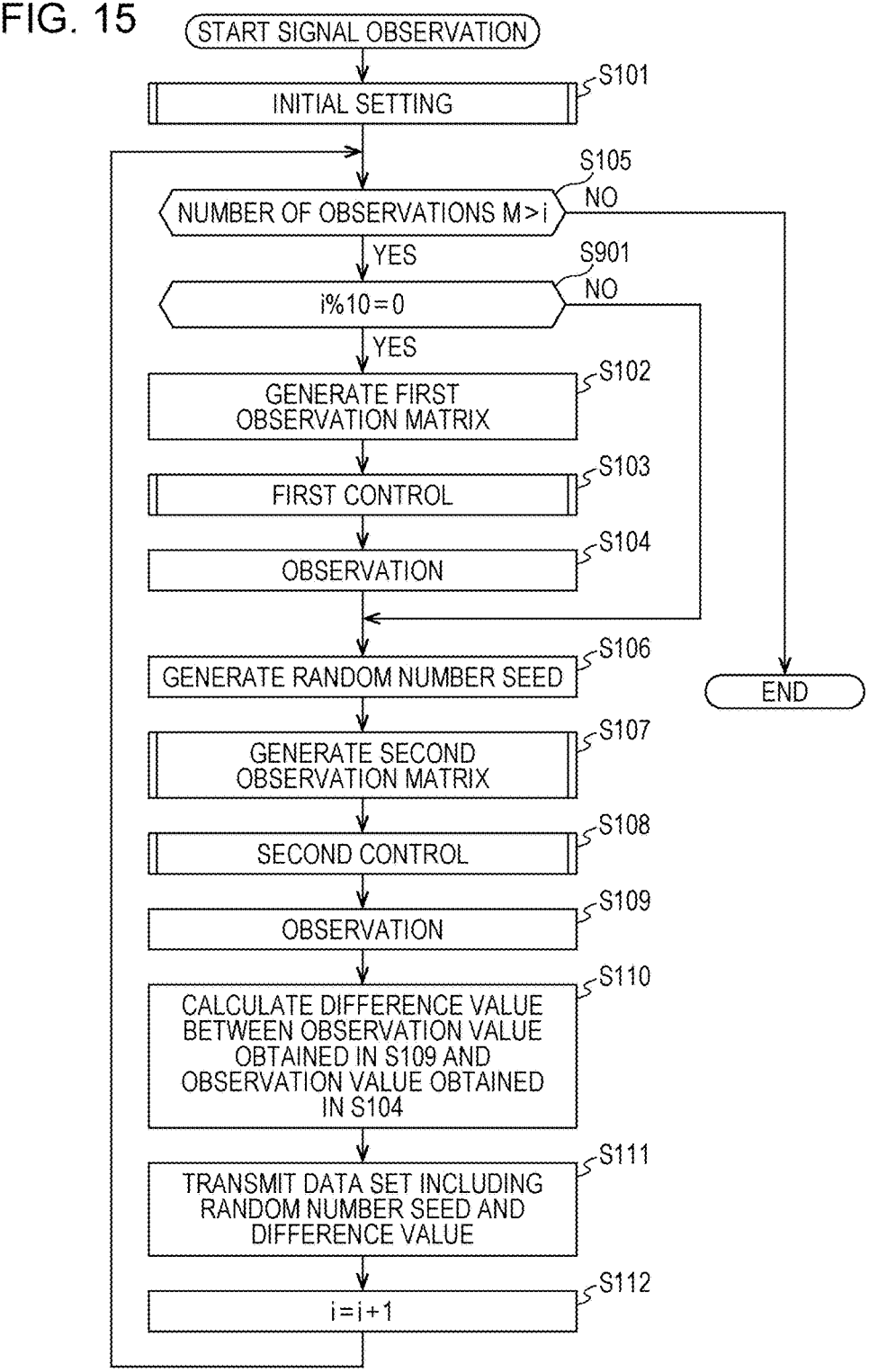
FIG. 15 is a flow chart illustrating an example of a signal observation process performed by a signal observation device according to Embodiment 3.

FIG. 15 is a flow chart illustrating an example of a signal observation process performed by a signal observation device 110 according to Embodiment 3. In FIG. 15, steps that are identical or similar to those in FIG. 5 are given identical reference signs, and description thereof is omitted as appropriate.

After initial setting (S101), a control unit 112 compares the number of observations M and an observation number counter i (S105). In a case where i is equal to or larger than M (N in S105), the signal observation device 110 finishes the signal observation process. Meanwhile, in a case where i is smaller than M (Y in S105), the control unit 112 determines whether or not a remainder obtained when the observation number counter i is divided by 10 is 0 (S901). That is, the control unit 112 determines whether or not an i-th observation is one performed every predetermined number of (10 in this example) times among the M observations. The predetermined number is 10 in the present embodiment but is not limited to this. The predetermined number is smaller than M.

In a case where the remainder obtained when the observation number counter i is divided by 10 is 0 (Y in S901), the control unit 112 performs a process for an observation using a first observation matrix (S102 through S104). Meanwhile, in a case where the remainder obtained when the observation number counter i is divided by 10 is not 0 (N in S901), the process for an observation using the first observation matrix is skipped, and a process for an observation using a second observation matrix is performed (S106 through S109). That is, the first control is applied in every predetermined number of (10 in this example) observations among a plurality of observations.

Then, the control unit 112 calculates a difference value by subtracting an observation value of a target signal observed in Step S104 from an observation value of the target signal observed in Step S109 (S110). A communication unit 117 transmits, to a signal restoration device 120, a data set including a random number seed generated in Step S106 and a difference value calculated in Step S110 (S111). Then, the value of the observation number counter i is incremented (S112) and the process returns to Step S105.

The aforementioned procedure is a procedure of the signal observation process performed by the signal observation device 110 illustrated in FIG. 15.

Effects

According to the signal observation device 110 of the present embodiment, the first control can be applied in every predetermined number of observations. It is therefore possible to calculate a difference value between observation values obtained in observations that are relatively close in time to each other, thereby making influence of noise caused by a temporal change low.

Embodiment 4

Next, Embodiment 4 is described below. The present embodiment is different from Embodiment 1 in that first control and second control are alternately applied in a plurality of observations. Differences of the present embodiment from Embodiment 1 are mainly described below.

Configuration

A configuration of a signal observation system according to the present embodiment is substantially identical to that of the signal observation system according to Embodiment 1 illustrated in FIG. 2, and therefore illustration and description thereof are omitted.

Operation of Signal Observation System

An operation of a signal observation system according to the present embodiment is specifically described below with reference to FIG. 16.

Figure 16:
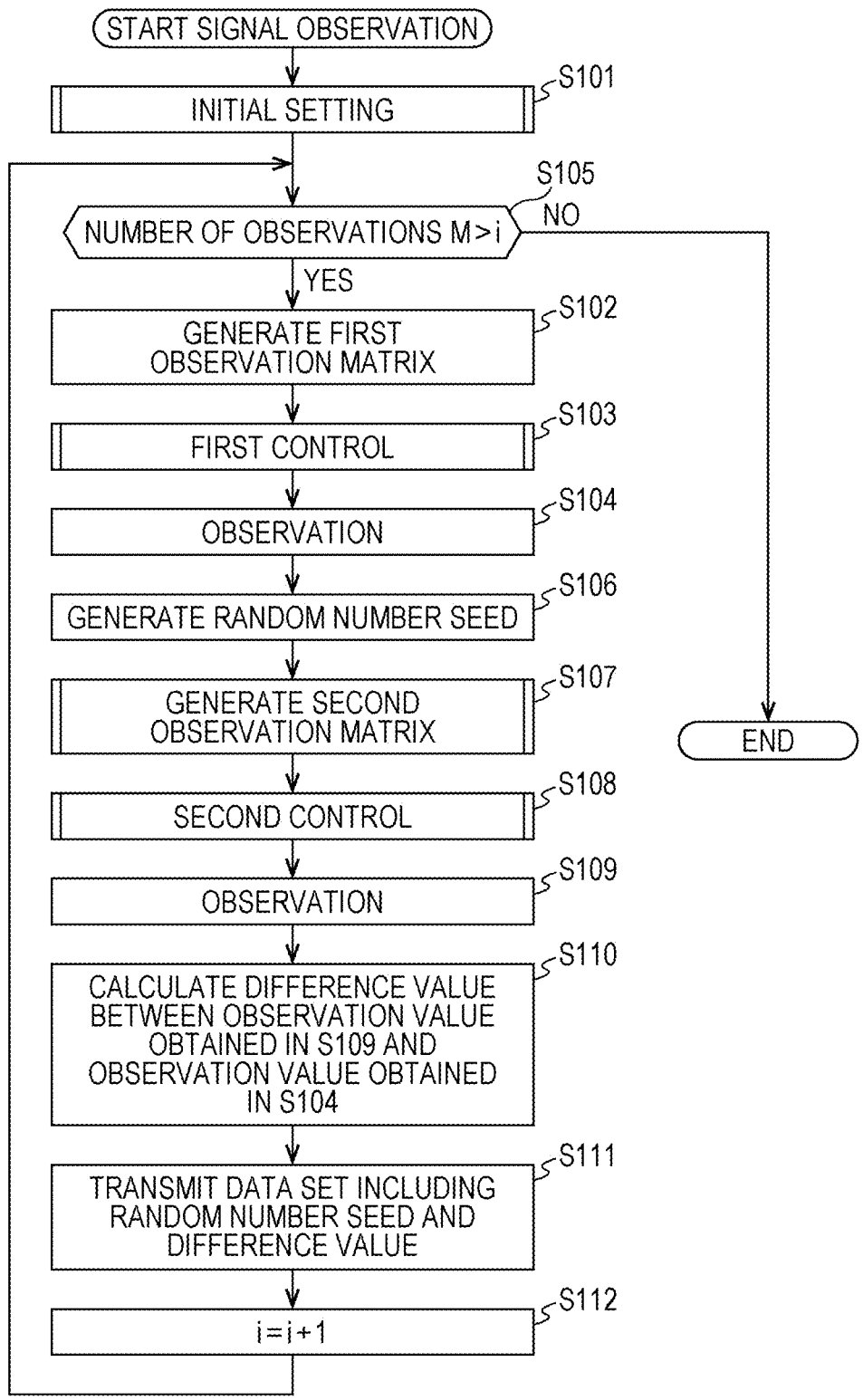
FIG. 16 is a flow chart illustrating an example of a signal observation process performed by a signal observation device according to Embodiment 4.

FIG. 16 is a flow chart illustrating an example of a signal observation process performed by a signal observation device 110 according to Embodiment 4. In FIG. 16, steps that are identical or similar to those in FIG. 5 are given identical reference signs, and description thereof is omitted as appropriate.

After initial setting (S101), a control unit 112 compares the number of observations M and an observation number counter i (S105). In a case where i is equal to or larger than M (N in S105), the signal observation device 110 finishes the signal observation process. Meanwhile, in a case where i is smaller than M (Y in S105), the control unit 112 performs a process for an observation using a first observation matrix (S102 through S104). Then, a process for an observation using a second observation matrix is performed (S106 through S109). That is, the first control and the second control are alternately applied in a plurality of observations.

Then, the control unit 112 calculates a difference value by subtracting an observation value of a target signal observed in Step S104 from an observation value of the target signal observed in Step S109 (S110). A communication unit 117 transmits, to a signal restoration device 120, a data set including a random number seed generated in Step S106 and a difference value calculated in Step S110 (S111). Then, the value of the observation number counter i is incremented (S112) and the process returns to Step S105.

The aforementioned procedure is a procedure of the signal observation process performed by the signal observation device 110 illustrated in FIG. 16.

Effects

According to the signal observation device 110 of the present embodiment, the first control and the second control can be alternately applied. It is therefore possible to calculate a difference value between observation values obtained in observations that are adjacent in time to each other, thereby making influence of noise caused by a temporal change low.

Embodiment 5

Next, Embodiment 5 is described below. The present embodiment is different from Embodiment 1 in that an identification number of a random number is transmitted from a signal observation device to a signal restoration device instead of a random number seed. Differences of the present embodiment from Embodiment 1 are mainly described below.

Configuration of Signal Observation System

Figure 17:
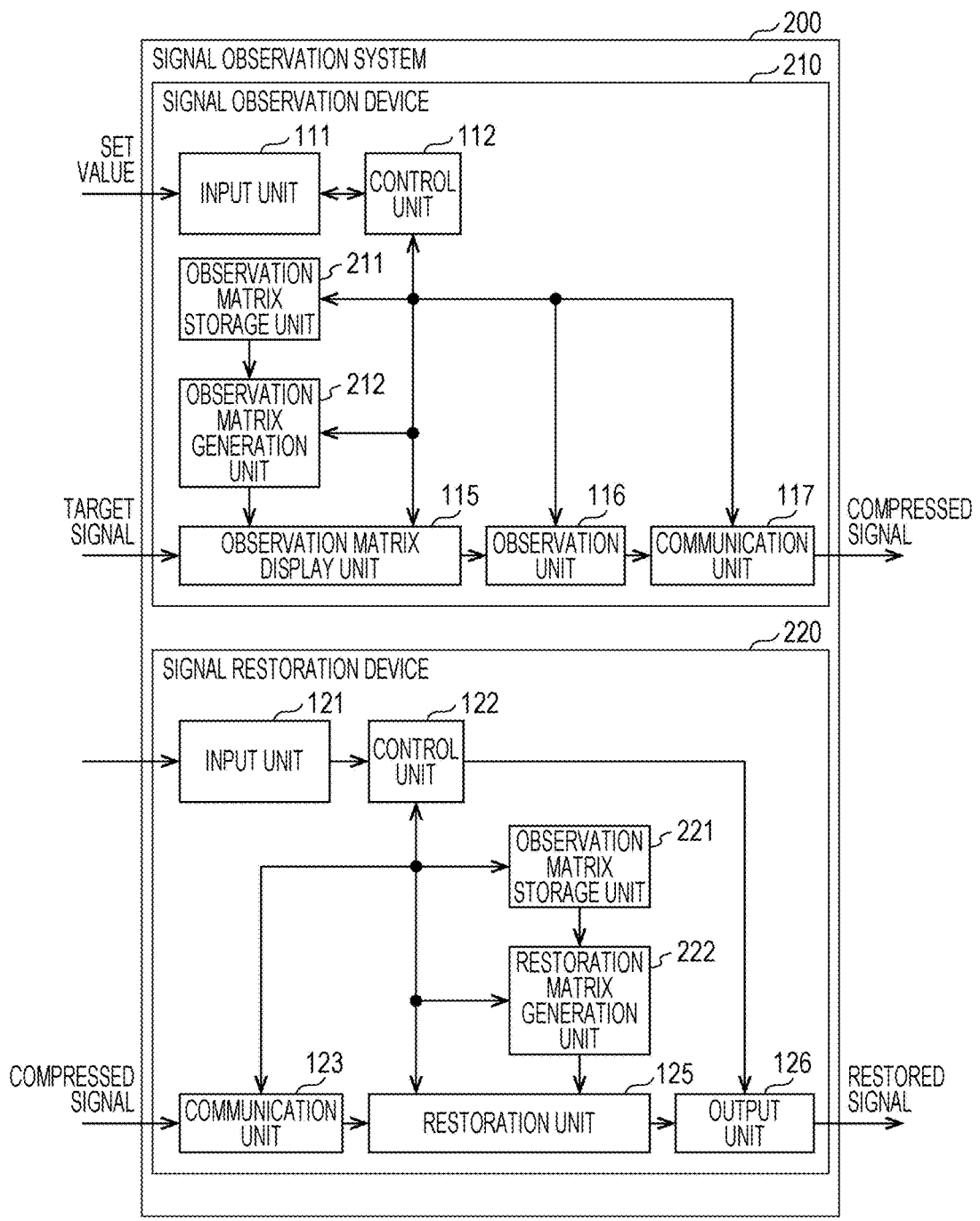
FIG. 17 is a block diagram illustrating an example of a configuration of a signal observation system according to Embodiment 5.

FIG. 17 is a block diagram illustrating an example of a configuration of a signal observation system 200 according to Embodiment 5. The signal observation system 200 includes a signal observation device 210 and a signal restoration device 220. In FIG. 17, constituent elements that are substantially identical to those in FIG. 1 are given identical reference signs, and description thereof is omitted as appropriate.

The signal observation device 210 observes a target signal to be observed plural times by using compressed sensing and outputs a compressed signal as a result of the observations.

The signal observation device 210 includes an input unit 111, a control unit 112, an observation matrix storage unit 211, an observation matrix generation unit 212, an observation matrix display unit 115, an observation unit 116, and a communication unit 117.

The observation matrix storage unit 211 is a storage device such as a hard disc drive. The observation matrix storage unit 211 stores therein a random number sequence. Furthermore, the observation matrix storage unit 211 stores therein information indicative of correspondences between identification numbers and addresses each indicating a reading start position of a random number sequence.

FIG. 18 is a diagram illustrating an example of the information indicative of correspondences between identification numbers and addresses. In FIG. 18, the identification numbers and the addresses of the observation matrix storage unit 211 correspond to each other on one-to-one basis, and a corresponding random number is associated with each of the addresses. A single address indicates a 1-bit position. Data is stored in the observation matrix storage unit 211, for example, in big endian format. For example, in FIG. 18, in a case where 18 random numbers are read out based on an identification number "0", 18 random numbers starting from the most significant bit of an address "0" are read out. Specifically, "010010001101101000" is read out. An address corresponding to an identification number is 8 bits in this example, but may be 1 bit or may be a different unit.

The observation matrix generation unit 212 reads out a plurality of random numbers from the observation matrix storage unit 211 on the basis of the number of pixels (the number of rows and the number of columns) of a target signal that are input to the input unit 111 and an identification number and generates a second observation matrix. Furthermore, the observation matrix generation unit 212 generates a first observation matrix having a predetermined pattern in a manner similar to the observation matrix generation unit 114 of Embodiment 1.

The signal restoration device 220 restores the target signal from the compressed signal and the identification number that are received from the signal observation device 210.

The signal restoration device 220 includes an input unit 121, a control unit 122, a communication unit 123, an observation matrix storage unit 221, a restoration matrix generation unit 222, a restoration unit 125, and an output unit 126.

The observation matrix storage unit 221 is a storage device such as a hard disc drive. The observation matrix storage unit 221 stores therein a random number sequence that is identical to that stored in the observation matrix storage unit 211 of the signal observation device 210. Furthermore, the observation matrix storage unit 221 stores therein addresses each indicating a reading start position of the random number sequence in association with identification numbers, as in the observation matrix storage unit 211. That is, in a case where the same identification number is used, the same random number can be read out from the observation matrix storage unit 211 and the observation matrix storage unit 221.

For example, in a case where a matrix identifier received from the signal observation device 210 is 0 and where the number of columns of the restoration matrix is 18, 18 random numbers starting from the most significant bit of the address 0 are read out with reference to FIG. 18. That is, "010010001101101000" is read out.

The restoration matrix generation unit 222 reads out a plurality of random numbers from the observation matrix storage unit 221 on the basis of the number of pixels of the target signal, the number of observations, and an identification number that are received from the signal observation device 210 and generates a second observation matrix. Then, the restoration matrix generation unit 222 generates a restoration matrix for restoring the target signal by using a plurality of second observation matrices, as in the restoration matrix generation unit 124 of Embodiment 1.

Operation of Compressed Signal Observation System

Next, an operation of a compressed signal observation system according to the present embodiment configured as above is specifically described with reference to FIGS. 19 through 21.

Figure 19:
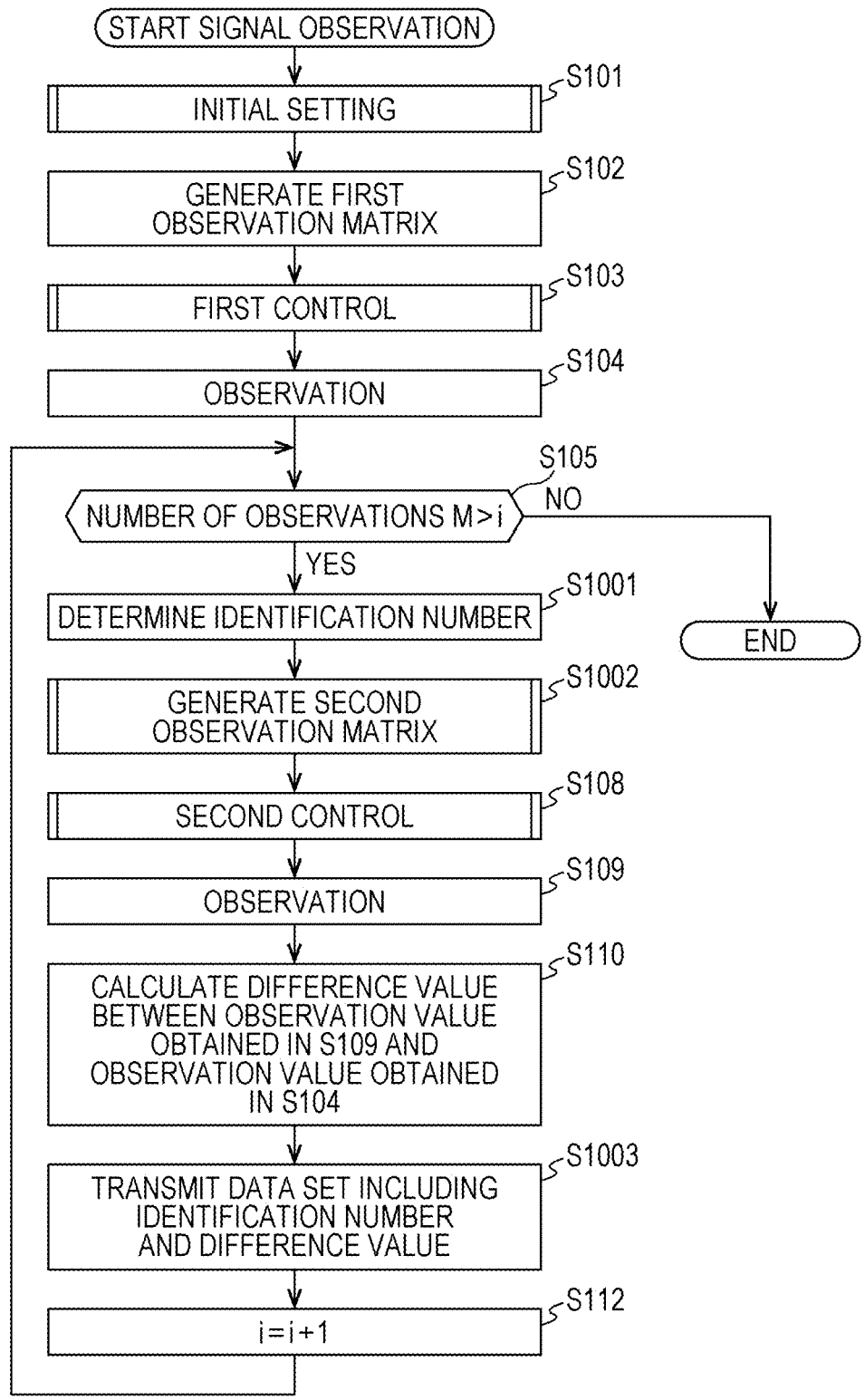
FIG. 19 is a flow chart illustrating an example of a signal observation process performed by a signal observation device according to Embodiment 5.

FIG. 19 is a flow chart illustrating an example of a signal observation process performed by the signal observation device 210 according to Embodiment 5. In FIG. 19, steps that are identical or similar to those in FIG. 5 are given identical reference signs, and description thereof is omitted as appropriate.

As illustrated in FIG. 19, the observation matrix generation unit 212 determines an identification number instead of generation of a random number seed in FIG. 5 (S1001). For example, the observation matrix generation unit 212 determines, as the identification number, the value of an observation number counter i. The observation matrix generation unit 212 generates a second observation matrix on the basis of the identification number (S1002).

The control unit 112 controls elements of the observation matrix display unit 115 on the basis of the generated second observation matrix (S108). That is, the control unit 112 performs second control. The observation unit 116 observes the volume of target signal transmitted via the observation matrix display unit 115 while the second control in Step S108 is being performed (S109). The control unit 112 calculates a difference value by subtracting an observation value of the target signal observed in Step S104 from an observation value of the target signal observed in Step S109 (S110). The communication unit 117 transmits, to the signal restoration device 220, a data set including the identification number determined in Step S1001 and the difference value calculated in Step S110 (S1003). Then, the value of the observation number counter i is incremented (S112) and the process returns to Step S105.

The aforementioned procedure is a procedure of the signal observation process performed by the signal observation device 210 illustrated in FIG. 19.

Figure 20:
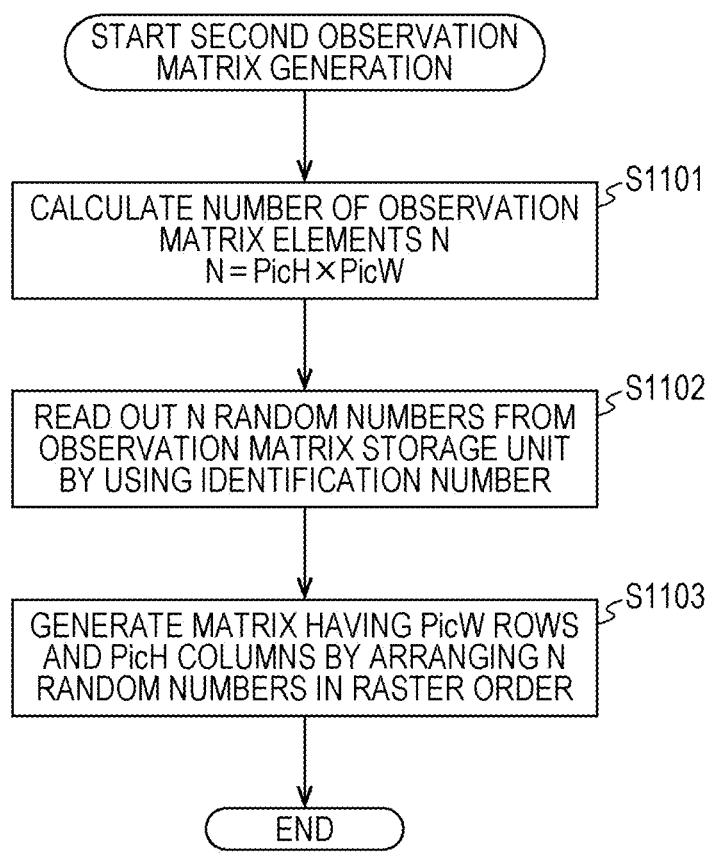
FIG. 20 is a flow chart illustrating an example of an observation matrix generation process performed by an observation matrix generation unit according to Embodiment 5.

FIG. 20 is a flow chart illustrating an example of an observation matrix generation process performed by the observation matrix generation unit 212. Specifically, FIG. 20 illustrates details of Step S1002 of FIG. 19.

As illustrated in FIG. 20, the observation matrix generation unit 212 calculates the number of elements N of the second observation matrix by using the number of vertical pixels PicH and the number of horizontal pixels PicW of the target signal that are received from the input unit 111 (S1101). Next, the observation matrix generation unit 212 reads out N random numbers from the observation matrix storage unit 211 by using the identification number (S1102). Specifically, the observation matrix generation unit 212 starts reading out random numbers from an address corresponding to the identification number and thus reads out N random numbers from the observation matrix storage unit 211. Then, the observation matrix generation unit 212 arranges the N random numbers thus read out in a raster order and thereby generates the second observation matrix having PicW rows and PicH columns (S1103).

The aforementioned procedure is a procedure of the observation matrix generation process performed by the observation matrix generation unit 212 illustrated in FIG. 20.

FIG. 21 is a flow chart illustrating an example of a restoration matrix generation process performed by the restoration matrix generation unit 222. FIG. 21 illustrates details of Step S506 of FIG. 10. In FIG. 21, steps that are identical or similar to those in FIG. 12 are given identical reference signs, and description thereof is omitted as appropriate.

As illustrated in FIG. 21, after the counter i is initialized to 0 (S703), the restoration matrix generation unit 222 derives an address in the observation matrix storage unit 221 that corresponds to an i-th identification number received by the communication unit 123 (S1201). The restoration matrix generation unit 222 reads out R random numbers stored in successive addresses starting from the derived address (S1202). The restoration matrix generation unit 222 adopts the R random numbers thus read out as an i-th row of the restoration matrix (S1203).

The aforementioned procedure is a procedure of the restoration matrix generation process performed by the restoration matrix generation unit 222 illustrated in FIG. 21.

Effects

According to the signal observation system 200 of the present embodiment, an identification number for generating an observation matrix can be transmitted instead of the observation matrix. It is therefore possible to save the volume of communication and the capacity of storage for the observation matrix.

Other Embodiments

A signal observation system according to one or a plurality of aspects has been described above on the basis of the embodiments, but the present disclosure is not limited to these embodiments. Various modifications of the embodiments that a person skilled in the art can think of can also be encompassed within the scope of the one or plurality of aspects as long as such modifications are not deviated from the purpose of the present disclosure.

For example, in each of the embodiments, a difference value between an observation value of a target signal based on a first observation matrix and an observation value of the target signal based on a second observation matrix is calculated in a signal observation device. However, the present disclosure is not limited to this. A difference value may be calculated in a signal restoration device.

Furthermore, in each of the embodiments, the observation matrix display unit 115 is a transmission-type liquid crystal display. However, the present disclosure is not limited to this. For example, the observation matrix display unit 115 may be a combination of a digital mirror device or an LCOS (Liquid Crystal On Silicon) and a lens, a mirror, or a prism. Alternatively, the observation matrix display unit 115 may be a shutter array. For example, in a case where the observation matrix display unit 115 is realized by a digital mirror device or an LCOS, the control unit 112 controls a pixel corresponding to a matrix element having a value of 0 among matrix elements of an observation matrix so that a target signal does not reach the observation unit 116 and controls a pixel corresponding to a matrix element having a value of 1 among the matrix elements of the observation matrix so that the target signal reaches the observation unit 116.

Furthermore, in each of the embodiments, a matrix in which values of all matrix elements are 0 is used as the first observation matrix having a predetermined pattern. However, the present disclosure is not limited to this. For example, a matrix in which values of all matrix elements are 1 may be used as the first observation matrix. Furthermore, the first observation matrix is not limited to a matrix in which values of matrix elements are uniform. For example, the first observation matrix may be a matrix in which 0 and 1 are alternately arranged.

Furthermore, in each of the embodiments, each matrix element of an observation matrix has a value of 0 or 1. However, the present disclosure is not limited to this. For example, a value of each matrix element of an observation matrix need not be an integer and may be a decimal number. In this case, each pixel of the observation matrix display unit 115 need just be controlled at transmittance corresponding to a value of a corresponding matrix element.

Furthermore, in each of the embodiments, the observation unit 116 is constituted by a single optical sensor. However, the present disclosure is not limited to this. For example, in a case where a target signal is a terahertz wave signal, the observation unit 116 may be constituted by a sensor that detects a terahertz wave signal. In a case where a target signal is an infrared signal, the observation unit 116 may be constituted by an infrared sensor. In a case where a target signal is an ultraviolet signal, the observation unit 116 may be constituted by an ultraviolet sensor. That is, the observation unit 116 may be constituted by any kind of sensor, as long as the observation unit 116 is a sensor appropriate for the kind of target signal. The observation unit 116 may be constituted by a plurality of optical sensors. The observation unit 116 may be constituted by any combination of plural kinds of sensors (e.g., an optical sensor, an infrared sensor, a terahertz wave sensor, and an ultraviolet sensor).

The present disclosure also includes in its scope the following.

(1) A specific example of the device described above is a computer system including a microprocessor, a ROM, a RAM, a hard disk unit, a display unit, a keyboard, a mouse, and the like. A computer program is stored in the RAM or the hard disk unit. In each device, the microprocessor operates according to the computer program thereby achieving the function of the device. The computer program is a combination of a plurality of instruction codes indicating instructions that are given to the computer to achieve a particular function.

(2) Part or all of the constituent elements of the device described above may be implemented in a single system LSI (Large Scale Integration). The system LSI is a super-multifunction LSI produced such that a plurality of parts are integrated on a single chip. More specifically, the system LSI is a computer system including a microprocessor, a ROM, a RAM, and so on. A computer program is stored in the RAM. In the system LSI, the microprocessor operates according to the computer program thereby achieving the function of the system LSI.

(3) Part or all of the constituent elements of the device described above may be implemented in the form of an IC card attachable to the device or in the form of a single module. The IC card or the module is a computer system including a microprocessor, a ROM, a RAM, and the like. The IC card or the module may include the super-multifunction LSI described above. In the IC card or the module, the microprocessor operates according to the computer program thereby achieving the function of the IC card or the module. The IC card or the module may be configured so as to be resistant against tampering.

(4) The present disclosure may be implemented as a method. The method may be realized by a computer program that is to be executed by a computer or the method may be realized by a digital signal associated with the computer program.

(5) The present disclosure may be implemented by a computer readable storage medium, such as a flexible disk, a hard disk, a CD-ROM, an MO disk, a DVD disk, a DVD-ROM disk, a DVD-RAM disk, a BD (Blu-ray Disc), a semiconductor memory, or the like in which the computer program or the digital signal are stored. The digital signal may be recorded in the storage medium described above.

The present disclosure may be implemented by transmitting the computer program or the digital signal via a telecommunication line, a wired or wireless communication line, a network typified by the Internet, data broadcasting, or the like.

The present disclosure may be implemented by a computer system including a microprocessor and a memory, wherein the computer program is stored in the memory and the microprocessor operates according to the computer program.

The program or the digital signal may be stored in the storage medium and the storage medium may be transported, or the program or the digital signal may be transferred via the network or the like thereby allowing the present disclosure to be implemented in another computer system.

The present disclosure is applicable as a signal observation device using compressed sensing.

What is claimed is:

1. A signal observation device comprising:
   a sensor that detects a volume of a target signal by using compressed sensing;
   a filter having a plurality of elements that are arranged in a matrix and that are configurable to individually restrict the volume of the target signal to be transmitted to the sensor; and
   a processor that causes the sensor to detect the volume of the target signal transmitted via the filter by using first control for controlling the elements of the filter on the basis of a first observation matrix in which values of matrix elements of the first observation matrix are predetermined and that causes the sensor to detect the volume of the target signal transmitted via the filter using second control for controlling the elements of the filter on the basis of a second observation matrix in which values of matrix elements of the second observation matrix are based on random numbers,
   wherein the processor causes the sensor to detect the volume of the target signal plural times by selectively using the first control and the second control, wherein all of the matrix elements of the first observation matrix have the same value.

2. The signal observation device according to claim 1, wherein
   in the first control, the elements of the filter are controlled, on the basis of the first observation matrix, to a restricted state in which the volume of the target signal to be transmitted to the sensor is restricted.

3. The signal observation device according to claim 1, wherein
   the first control is applied in an initial one of plural detections of the sensor.

4. The signal observation device according to claim 1, wherein
the first control is applied in a middle one of plural detections of the sensor.

5. The signal observation device according to claim 1, wherein
the first control is applied in every predetermined number of detections among plural detections of the sensor.

6. The signal observation device according to claim 1, wherein
the first control and the second control are alternately applied in plural detections of the sensor.

7. The signal observation device according to claim 1, wherein
the processor calculates a difference value between the volume of the target signal detected by using the first control and the volume of the target signal detected by using the second control; and
the signal observation device further comprises a communicator that transmits the difference value to a signal restoration device that restores the target signal by using the difference value.

8. A signal observation method, executed by a signal observation device having a sensor that detects a volume of a target signal by using compressed sensing, a filter having a plurality of elements that are arranged in a matrix and that are configurable to individually restrict the volume of the target signal to be transmitted to the sensor, and a processor that causes the sensor to detect the volume of the target signal transmitted via the filter by using first control for controlling the elements of the filter on the basis of a first observation matrix in which values of matrix elements of the first observation matrix are predetermined and that causes the sensor to detect the volume of the target signal transmitted via the filter using second control for controlling the elements of the filter on the basis of a second observation matrix in which values of matrix elements of the second observation matrix are based on random numbers, the method comprising:
performing, with the processor, first control for controlling, on the basis of the first observation matrix in which the values of the matrix elements of the first observation matrix are predetermined, the plurality of elements that are arranged in the matrix to individually restrict the a volume of the target signal to be transmitted to the sensor of the signal observation device;
performing, with the processor, second control for controlling the plurality of elements on the basis of the second observation matrix in which values of the matrix elements of the second observation matrix are based on random numbers; and
detecting, with the sensor, plural times by using compressed sensing, the target signal transmitted to the sensor through the plurality of elements controlled by the first control or the second control,
in at least one of the plural detections of the sensor, the target signal transmitted to the sensor is detected through the plurality of elements controlled by the first control, wherein
all of the matrix elements of the first observation matrix have the same value.

9. A non-transitory recording medium storing a program, the program causing a computer to control a signal observation device having a sensor that detects a volume of a target signal by using compressed sensing, a filter having a plurality of elements that are arranged in a matrix and that are configurable to individually restrict the volume of the target signal to be transmitted to the sensor, and a processor that causes the sensor to detect the volume of the target signal transmitted via the filter by using first control for controlling the elements of the filter on the basis of a first observation matrix in which values of matrix elements of the first observation matrix are predetermined and that causes the sensor to detect the volume of the target signal transmitted via the filter using second control for controlling the elements of the filter on the basis of a second observation matrix in which values of matrix elements of the second observation matrix are based on random numbers, the program causing the computer to control the signal observation device to:
perform, with the processor, first control for controlling, on the basis of the first observation matrix in which the values of the matrix elements of the first observation matrix are predetermined, the plurality of elements that are arranged in the matrix to individually restrict the volume of the target signal to be transmitted to the sensor of the computer;
perform, with the processor, second control for controlling the plurality of elements on the basis of the second observation matrix in which values of the matrix elements of the second observation matrix are based on random numbers; and
detect, with the sensor, plural times by using compressed sensing, the target signal transmitted to the sensor through the plurality of elements controlled by the first control or the second control,
in at least one of the plural detections of the sensor, the target signal transmitted to the sensor is detected through the plurality of elements controlled by the first control, wherein
all of the matrix elements of the first observation matrix have the same value.

* * * * *